United States Patent
Lapierre

(10) Patent No.: US 11,531,944 B2
(45) Date of Patent: Dec. 20, 2022

(54) COMPUTER-BASED SUPPLIER KNOWLEDGE MANAGEMENT SYSTEM AND METHOD

(71) Applicant: Tealbook, Inc., Toronto (CA)

(72) Inventor: Stephany Lapierre, Toronto (CA)

(73) Assignee: TEALBOOK INC., Toronto (CA)

( * ) Notice: Subject to any disclaimer, the term of this patent is extended or adjusted under 35 U.S.C. 154(b) by 208 days.

(21) Appl. No.: 16/095,046

(22) PCT Filed: Apr. 20, 2017

(86) PCT No.: PCT/IB2017/052286
§ 371 (c)(1),
(2) Date: Oct. 19, 2018

(87) PCT Pub. No.: WO2017/182982
PCT Pub. Date: Oct. 26, 2017

(65) Prior Publication Data
US 2019/0114566 A1    Apr. 18, 2019

Related U.S. Application Data

(60) Provisional application No. 62/325,029, filed on Apr. 20, 2016.

(51) Int. Cl.
*G06Q 10/06* (2012.01)
*G06Q 10/08* (2012.01)

(52) U.S. Cl.
CPC ..... *G06Q 10/06313* (2013.01); *G06Q 10/067* (2013.01); *G06Q 10/087* (2013.01)

(58) Field of Classification Search
CPC .......... G06Q 10/06313; G06Q 10/067; G06Q 10/087
See application file for complete search history.

(56) References Cited

U.S. PATENT DOCUMENTS 8,117,069 B2   2/2012   Law et al.
8,121,891 B2   2/2012   Handel et al.
(Continued)

FOREIGN PATENT DOCUMENTS

WO         0030004        5/2000
WO   WO-2010018450 A2 *  2/2010  ......... G06Q 30/0261

OTHER PUBLICATIONS

Michael E. D. Koenig. What is KM? Knowledge Management Explained. KM World, Jan. 15, 2018. (Year: 2018).*
(Continued)

*Primary Examiner* — Stephanie Z Delich
(74) *Attorney, Agent, or Firm* — Onello & Mello, LLP

(57) ABSTRACT

Provided is a computer-based supplier knowledge management method, system, and computer program product. The system embodies the computer program code which, when executed performs the method. The method includes establishing an electronic profile for one or more users from an entity; establishing an electronic supplier profile for each of a plurality of suppliers, each supplier profile comprising a set of supplier keywords; generating an electronic RFI by an entity user, the RFI comprising a set of user specified RFI keywords corresponding to a project; and electronically processing the RFI, including performing keyword matching between the RFI keywords and one or more of the supplier profiles and generating a list of candidate suppliers for the project based, at least in part, on the keyword matching.

28 Claims, 26 Drawing Sheets

(56) References Cited

U.S. PATENT DOCUMENTS

| | | | |
|---|---|---|---|
| 2002/0007324 A1* | 1/2002 | Centner | G06Q 50/188 |
| | | | 705/26.4 |
| 2002/0035501 A1 | 3/2002 | Handel et al. | |
| 2004/0093321 A1* | 5/2004 | Roustant | G06F 16/9535 |
| 2005/0203800 A1* | 9/2005 | Sweeney | G06Q 30/02 |
| | | | 705/14.16 |
| 2007/0112712 A1* | 5/2007 | Flinn | G06Q 30/0283 |
| | | | 706/45 |
| 2010/0063835 A1* | 3/2010 | Kenedy | G06F 19/3456 |
| | | | 705/2 |
| 2011/0145066 A1 | 6/2011 | Law et al. | |
| 2013/0262104 A1* | 10/2013 | Makhija | G06Q 10/087 |
| | | | 704/235 |
| 2014/0067611 A1 | 3/2014 | Adachi et al. | |
| 2014/0358810 A1* | 12/2014 | Hardtke | G06Q 10/105 |
| | | | 705/321 |
| 2016/0188601 A1* | 6/2016 | Ganesamoorthi | G16H 70/60 |
| | | | 705/2 |
| 2016/0335603 A1* | 11/2016 | Davar | G06F 16/28 |

OTHER PUBLICATIONS

International Search Report and Written Opinion dated Aug. 1, 2017 issued corresponding International Application No. PCT/IB2017/052286.

* cited by examiner

206 ➔

Defining the future of digital health. Klick Health is the world's largest independent digital health agency. Lorem ipsum dolor sit amet. Dolor tempor elitr sea clita stet sanctus. Accumsan esse nostrud vero elitr cum est. Ipsum est ipsum amet autem clita kasd clita. Imperdiet lorem vero adipiscing et molestie esse ex. Erat elitr tation sea sed at vero sea. Adipiscing diam facilisis erat et sit duo accusam. Eu ut rebum elitr sea. No wisi facilisis. Facilisi at magna lorem et est aliquyam vero. Delenit duis odio vulputate ea no diam duo. Rebum doming wisi. Quod sit labore nam dolor suscipit lorem facilisis. Dolor et dolor diam tation vero. Ut diam aliquyam et ipsum hendrerit aliquyam party party assum. Dolor invidunt nibh ea justo facilisi dolores. Et ea gubergren sanctus. Sed amet diam. Option eum et eirmod nostrud dolore. Gubergren sea voluptua vel at. Vero dolore dolor sadipscing sea. Sed ex gubergren justo volutpat clita facilisis. Et invidunt et voluptua congue lorem et elit. Ut dolore ipsum illum et. Ipsum eos diam. Sea banana ut diam. Dolore sit erat duo dolore sit et diam. Invidunt magna illum. Amet clita tempor ipsum velit.

Goodbye Vanity URLs! Google Lorem ipsum dolor sit amet. accusam. Eu ut rebum elitr sea. No wis et est aliquyam vero.

Last weekend we had the absolute privilege in marching at the 2015 Toronto Pride Parade. Lorem ipsum dolor sit amet. Dolor tempor elitr sea clita stet sanctus. Accumsan esse nostrud vero elitr cum est. Ipsum est ipsum amet autem clita kasd clita. Imperdiet lorem vero adipiscing et molestie esse ex. Erat elitr tation sea sed at vero sea. Adipiscing Now that we have had a bit of time Lorem ipsum dolor sit amet. Dolor tempor elitr sea clita stet sanctus. Accumsan esse nostrud vero elitr cum est. Ipsum fugazi est ipsum amet autem clita kasd clita. Imperdiet lorem pixies vero adipiscing et molestie esse ex. Erat elitr tation sea sed at vero sea. Adipiscing Last week we surprised over 300 Klicksters with a poutine lunch from Putineville. Lorem ipsum dolor sit amet. Dolor tempor elitr sea clita stet sanctus. Accumsan esse nostrud vero elitr cum est. Ipsum yum yum est ipsum amet autem clita kasd arous clita. Imperdiet lorem gravy vero adipiscing et molestie esse ex. Erat et vero sea.

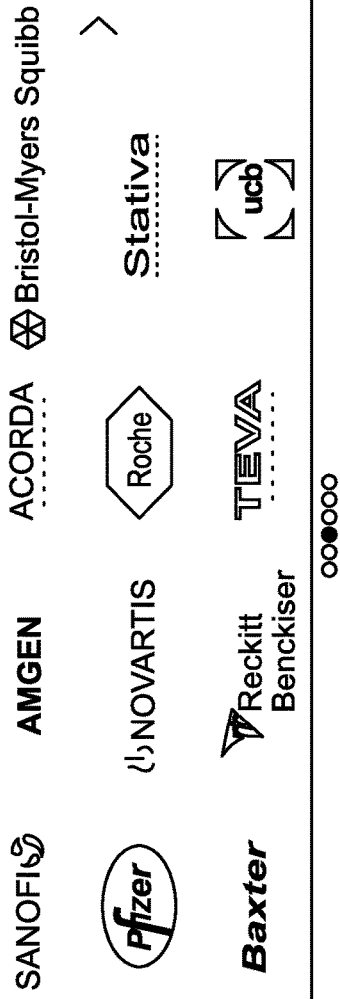

208 ➔

*Your industry peers have endorsed Klick, Inc. with these tags:*

[1 oncology] [8 digital] [2 knowledge management] [2 digital advertising]
[1 ecm solution] [1 r.i.m.] [1 sensei lab] [1 entreprise-wide] [1 interactive] [1 agency]
[1 digital advertising and marketing] [1 aor]

FIG. 2B

Primary Contact: In business since Employees:

Erwin Tumangday  1997  200-500
VP Buisness Development
1(917)XXX-XXXX  Parent Company
etumangday@klick.com
                    Yes
Add a new contact

Secondary Contact:

Alec Melkonian
SVP Sales and Client Services
1 (917)XXX-XXXX
amelkonian@klick.com

210

Global Partners              Primary Customers

NO                               Marketing, Commercial, Tech, Clinical, Medical,
                                 Biotech, Pharma, Information Technology,
Website                      Corporate Communications, Sales, Field Sales,
                                 Operations, Project Management
http://klick.com
                                 Good At

Defining the future of digital health    ~214

Services
Advertising, Booth Development/Conference Services,
Clinical Research Organization, Digital, Direct Mail, Gaming,
Labeling and Packaging, Market Research, Medical Communications,
Medical Information Services, Medical Writing, Mode of Action (MDA) Animation,
Naming, Non-Personal Promotions, Online Meetings, Patient Support,
Portal (KOL, Patient, Internal) Pricing and Reimbursement, Public Relations, Social Media

Add Osedea to tealbook  
340

Use tags to describe your supplier's services or specialities.

Learn more about tagging>

Note: we do not share your notes or tags with anyone on tealbook

[digital×] [creative×] [training×] ex  ↙342

| user experience |
|---|
| exhibits |
| exhibit design |
| ranexa |
| nexavar |
| business expansions |
| commercial excellence |

↙342

Please indicate your relationship with this supplier:

Currently working with this supplier ○ ↙344

Worked with this supplier in the past ○

Never worked with this supplier but want to stay connected ○

346 — [Add to tealbook]

[Close]

FIG. 3B tealbook    home    corporate admin    tealboard    VETs    profile

Welcome to your tealboard

See what your suppliers are talking about on social media to help you stay on top of the latest industry trends

360

Q Filter by keyword or company name...

Filter by:
All tealbook Suppliers ←364
My Suppliers
My Company's Suppliers

Refresh Your tealboard ←366

362

Dudnyk
Not Just Millennials: Consumers Want Experiences Not Things http://t.co/k7faID2EMQ via @ada..
Heartbeat Experts, Truven Health Analytics
I added a video to a @YouTube playlist http://t.co/dBVrcDQwnR Two Minutes: How Health Plans Can Work More Closely...

Guard Dog Brand Development
Guard Dog welcomes our new Executive Director!
http://t.com/ky0MvLWRic

Epsilion

Giant Creative Strategy
How doctors want to die is different than most people: CNN

Concentric Health Experience

Concentric Health Experience
Two new studies examine the unexpectedly complex interactions that happen when you put a small child on your lap and open a picture book.

Concentric Health Experience
MUSIC is good for your #HEALTH - #ConcentricHX - #StPaulandTheBrokenBones - Grass is Greener No updates available. Try changing your "filter by:" above to view updates from different suppliers

FIG. 3C tealbook     home     corporate admin     tealboard     VETs     👁     profile ⚙ Administration Panel
Manage your employees, find and review suppliers and track VETs.

372 → Employees   Suppliers   VETs   Membership

| Name | Email | Position | Department | Number of Suppliers | Admin | |
|---|---|---|---|---|---|---|
| Employee 1 | E1@tealbook.com | tb | | 0 | ☐ | 🗑 |
| Employee 2 | E2@osedea.com | | | 3 | ☑ | 🗑 |
| Employee 3 | E3@matchbookinc.com | business development | business development | 47 | ☑ | 🗑 |
| Employee 4 | E4@matchbookinc.com | Director Business Development | | 3 | ☑ | 🗑 |
| Employee 5 | E5@matchbookinc.com | Matchbook | | 0 | ☑ | 🗑 |
| Employee 6 | E6@tealbook.com | Business Development | Business Development | 49 | ☑ | 🗑 |
| Employee 7 | E7@matchbookinc.com | President | | 64 | ☑ | 🗑 |
| Employee 8 | E8@matchbookinc.com | Business Development | | 23 | ☑ | 🗑 |
| Employee 9 | E9@tealbook.com | noidea | noidea | 8 | ☑ | 🗑 |
| Employee 10 | E10@osedea.com | Graphic Design | Development | 0 | ☐ | 🗑 |

FIG. 3E tealbook     home     corporate admin     tealboard     VETs     profile

Administration Panel
Manage your employees, find and review suppliers and track VETs.

372 → Employees  Suppliers  VETs  Membership

Employee Details: Stephany Lapierre

Email:
slapierre@matchbookinc.com

Position
President

Supplier Tags

The CementBloc
Tags:
[product launch], [AOR], [advertising]

Eveo
Tags:
[Digital], [Advertising], [west coast], [aor]

INVIVO Communications Inc.
Tags:
[Animation], [MOA], [Digital]

375

FIG. 3G tealbook | home corporate admin tealboard VETs 👁 profile

⚙ Administration Panel
Manage your employees, find and review suppliers and track VETs.

Employees  Suppliers  VETs  Membership

385

Klick, Inc

Defining the future of digital health. Klick Health is the world's largest independent digital health agency. Lorem ipsum dolor sit amet. Dolor tempor elitr sea clita stet sanctus. Accumsan esse nostrud vero elitr cum est. Ipsum est ipsum amet autem clita kasd clita. Imperdiet lorem vero adipiscing et molestie esse ex. Erat elitr tation sea sed at vero sea. Adipiscing diam facilisis erat et sit duo accusam. Eu ut rebum elitr sea. No wisi facilisis. Facilisis at magna lorem et est aliquyam vero. Delenit duis odio vulputate ea no diam duo. Rebum doming wisi. Quod dude sit labore nam dolor suscipit lorem facilisis. Dolor et dolor diam tation vero. Ut diam aliquyam et ipsum hendrerit aliquyam party party assum. Dolor invidunt nibh ea justo facilisi dolores. Et ea gubergren sanctus. Sed amet diam. Option eum et eirmod nostrud dolore. Gubergren sea voluptua vel at. Vero dolore dolor sadipscing sea. Sed ex gubergren justo volutpat clita facilisis. Et invidunt et voluptua congue lorem et elit. Ut dolore ipsum illum et. Ipsum eos diam. Sea banana ut diam. Dolore sit erat duo dolore sit et diam. Invidunt magna illum. Amet clita tempor ipsum velit.

Tags
digital | knowledge management | agency
digital advertising | oncology
entreprise-wide | interactive Make Klick, Inc. a preferred supplier?
☐

Authorizations
This suppliers has no special authorizations right now.

Add Authorization

Number of employees that have tagged this vender:

5

View employees who have tagged>

Name

Adherence reminders and drivers to an unbranded website  Created by ⬥ Greg Kresge

FIG. 4A tealbook    home    corporate admin    tealboard    VETs    profile

Validation Expertise Tool (VET)    400
Use this form to tell us more about your business needs. To receive relevant, targeted responses from your selected suppliers, please provide as much informatoin as possible. Need help?

VET Steps

- Name and Need
- Overview
- Outcomes
- Criteria and Budget
- Collaborators
- Additional Info
- Next Steps

Name

Please enter up to 10 keywords that best describe your supplier needs.*
(global, medical, communication, energy, product launch)

402 — Press enter to tag

Provide a title for your supplier search.*

404 — My project.

Need

What type of service are you looking for?*
(advertising, medical, communication, clinical research energy, product - maximum 10 tags)

406 — Press enter to tag
Supporting what need

408 — Product launch, adherence, clinical trial
Supporting which business function?*

410 — marketing, medical affairs, regulatory, clinical
Supporting what product? (optional)

412 — name of the product if applicable
Supporting what therapeutic area of indication? (optional)

414 — name of the product if applicable
Location? (optional)

416 — Select Location

Next Step

★ Tip:

Keywords help tealbook provide targeted supplier recommendations for your business need.

tealbook also recognizes trends and supplier endorsements from clients in similar functions and service requirements. tealbook will use your keywords to start the matching process and provide targeted supplier recommendations that est meet your business needs.

tealbook home    corporate admin    tealboard    VETs    profile

Validation Expertise Tool (VET)
Use this form to tell us more about your business needs. To receive relevant, targeted responses from your selected suppliers, please provide as much informatoin as possible. Need help?

VET Steps
- Name and Need ✓
- Overview
- Outcomes
- Criteria and Budget
- Collaborators
- Additional Info
- Next Steps

VET Settings
- Cancel VET >
- Remove me from this VET >

Overview

Summary*: (500 characters left)

Please provide a summary of your needs, and why you are initiating a suppler search. — 422

Challenges (optional)

If applicable, please describe any relevant challenges facing this initiative. — 424

[ Next Step ]

★ Tip:
To ensure better supplier responses and simplify the process, include as much information as possible on your initiative.

420

FIG. 4B tealbook   home   corporate admin   tealboard   VETs   profile

430

Validation Expertise Tool (VET)
Use this form to tell us more about your business needs. To receive relevant, targeted responses from your selected suppliers, please provide as much informatoin as possible. Need help?

VET Steps

Name and Need >
Overview >
Outcomes
Criteria and Budget
Collaborators
Additional Info
Next Steps

VET Settings
Cancel VET >
Remove me from this VET >

Outcomes

Outcomes:* — 432
In your words please describe what a successful outcome looks like.

Deliverables:* — 434
(positioning, planning, execution...)
What deliverables do you expect from the selected supplier?

Target audience:* — 436
What audience(s) are you targeting?

[ Next Step ]

★ Tip:
Be as specific as possible about your deliverables and target audience.

FIG. 4C tealbook     home     corporate admin     tealboard     VETs     profile

Validation Expertise Tool (VET)

Use this form to tell us more about your business needs. To receive relevant, targeted responses from your selected suppliers, please provide as much information as possible. Need help?

VET Steps

Name and Need   >
Overview   >
Outcomes   >
Criteria and Budget
Collaborators
Additional Info
Next Steps

VET Settings

Cancel VET >
Remove me from this VET >

Criteria and Budget

Critical
List criteria that are non-negotiable, such as experience (therapeutic area, initiatives, etc.) and service type.*

[ Critical ] — 442

Important
List criteria that are important, but not critical to selecting a supplier. (optional)

[ Important ] — 444

Bonus
List criteria that you consider nice-to-have but not essential. (optional)

[ Bonus ] — 446

Indicate the budget range allocated to this initiative.*

[ Select A Range ▾ ] — 448

[ Next Step ]

★ Tip:
Be sure to include any non-negotiable criteria and a realistic budget estimate, as this helps suppliers accurately assess the opportunity and prepare a response

440

FIG. 4D tealbook
home    corporate admin    tealboard    VETs    profile

Validation Expertise Tool (VET)
Use this form to tell us more about your business needs. To receive relevant, targeted responses from your selected suppliers, please provide as much informatoin as possible. Need help?

| VET Steps | | Additional Info | Additional Info: (optional) | ★ Tip: |
|---|---|---|---|---|
| Name and Need | > | | Is there anything else you would like to share with suppliers to help them provide a response that is highly targeted to your needs? Please attach any relevant documents below. | Is there anything else that suppliers should know about the opportunity? —452 |
| Overview | > | | | |
| Outcomes | > | | When would you like to receive a response by?* | |
| Criteria and Budget | > | | [Response By] —454 | |
| Collaborators | > | | When is your preferred start date for a new partner?* | |
| Additional Info | | | [Start Date] —456 | |
| Next Steps | | | Upload a file for your VET | |
| | | | ⊕ Upload Files | |
| VET Settings | | | How will this VET be managed? | |
| Cancel VET > | | | ○ Managed by me | |
| Remove me from this VET > | | | ○ Managed by our procurement team | |
| | | | ○ By a third party | |
| | | | [Next Step] —458 | |

FIG. 4E

450 tealbook home    corporate admin    tealboard    VETs    profile

460

Validation Expertise Tool (VET)
Use this form to tell us more about your business needs. To receive relevant, targeted responses from your selected suppliers, please provide as much informatoin as possible. Need help?

VET Steps

Name and Need >
Overview >
Outcomes >
Criteria and Budget >
Collaborators >
Additional Info >
| Next Steps > |

Next Steps

🗣 Invite your own suppliers to respond and/or receive additional supplier recommendations. You ca invite a maximum of 10 supplier to respond.
📁 Review supplier profiles carefully before sending invitations.
✉ Participating suppliers have 10 days to upload their responses to your tealbook. You will be notified by tealbook when you receive a response.

| Get Supplier Recommendations | — 462

VET Settings
Cancel VET >
Remove me from this VET >

COMPUTER-BASED SUPPLIER KNOWLEDGE MANAGEMENT SYSTEM AND METHOD

CROSS REFERENCE TO RELATED APPLICATIONS

The present application claims priority under 35 USC 119(e) to U.S. Provisional Patent Application Ser. No. 62/325,029, entitled "COMPUTER-BASED SUPPLIER KNOWLEDGE MANAGEMENT SYSTEM AND METHOD," filed Apr. 20, 2016, which is incorporated herein by reference in its entirety.

FIELD OF INTEREST

The present inventive concepts relate to the field of computer-based systems useful for supplier/vendor selection and management and, more particularly, to an automated system and method for matching user needs and requirements with suppliers offering services that fulfill such needs and requirements.

BACKGROUND

Oftentimes, sourcing suppliers for providing various goods and/or services can prove to be an arduous and time-consuming task. Finding qualified providers for a wide variety of company needs can involve searching for suppliers that offer particular goods and/or services, seeking reviews or recommendations for the suppliers, validating supplier-provided information based on such recommendations, reaching out to selected suppliers for further information regarding their qualifications and their ability to meet specific needs. All of this must be completed before buying organizations can submit requests for bids to the suppliers for the intended purchases. This can be a very inefficient process, particularly within a larger entity where many levels of approval must be sought before a supplier can be selected. Further, in instances where one division or department within an entity may have preferred suppliers for particular goods and/or services, other departments within that entity could be unnecessarily performing the above vetting process, being unaware of the former department's knowledge of suppliers for particular services.

There is a need for a technical solution to the above problems, and related problems of organizing and managing data and information in a distributed computer platform that enables efficient searching, utilization, and management of supplier information by client-users that shortens and improves the client-user interaction with the computer system to more rapidly and effectively generate concise, filtered and targeted results for candidate suppliers, where the client-users are consumers of supplier goods and services.

SUMMARY

In accordance with one aspect of the present disclosure, provided is a computer-based supplier knowledge management (SKM) system. The SKM system provides a unique, online supplier knowledge management platform that will enable entities, e.g., companies, to streamline the supplier discovery process to make it more targeted and efficient, particularly for large organizations or small organizations with resource constraints. Using the SKM system, individuals within an entity can quickly connect with their suppliers and receive credible recommendations about those suppliers based on their specific requirements and criteria.

The system and method offers several advantages over existing processes and systems used in supplier knowledge management, such as:

Can be implemented as SaaS-based supplier network connecting healthcare companies, as a representative example, to trusted suppliers.

Facilitates better and faster supplier selection, while building and preserving institutional knowledge.

Enables faster, targeted, and more efficient supplier selection with reduced operational costs, better workflow, faster onboarding, and better supplier outcomes.

Can be configured to connect entities (e.g., healthcare companies) to credible suppliers across all goods and/or services categories.

Can include a cloud-based database that provides the most up to date supplier information (profiles managed by suppliers).

Can include and utilize a client-populated and client-endorsed supplier database.

Can offer greater perspective and insight on suppliers through endorsements from employees and industry peers—built on a trust principal, e.g., "connect with suppliers endorsed by people you trust."

Offers faster access to highly suitable supplier recommendations adapted to each business requirement request for information (RFI)—smart matching powered by data on clients, client/supplier connections, endorsements and trends.

Builds institutional knowledge through employees' supplier connections, endorsements, issued RFIs, and supplier responses.

Helps clients stay on top of industry trends, news, and best practices and learn from suppliers successes through suppliers' social media feeds, such as Tealboard™.

Expands purchasing scope/influence.

Deepens influence on complex indirect spend categories to drive value beyond sourcing.

Reduces cost of procurement operating expenses via improved process efficiencies.

Provides supply market intelligence capabilities.

In accordance with an aspect of the inventive concept, provided is a computer-based supplier selection and management method. The method comprises providing a network accessible computer system comprising at least one computer processor coupled to at least one storage medium and computer program code configured for storage therein and execution thereby and executing the computer program code to perform the method. The method includes: establishing an electronic profile for one or more users from an entity; establishing an electronic supplier profile for each of a plurality of suppliers, each supplier profile comprising a set of supplier keywords; generating an electronic RFI by an entity user, the RFI comprising a set of user specified RFI keywords corresponding to a project; and electronically processing the RFI, including performing keyword matching between the RFI keywords and one or more of the supplier profiles and generating a list of candidate suppliers for the project based, at least in part, on the keyword matching.

In various embodiments, the RFI identifies one or more RFI service type for the project and each supplier profile includes one or more supplier service type and processing the RFI includes service type matching that determines the set of candidate suppliers as suppliers having a service type matching an RFI service type.

In various embodiments, the system performs the good and/or service type matching before the keyword matching and the keyword matching is only performed on supplier profiles having a good and/or service type match.

In various embodiments, performing the keyword matching includes calculating a keyword matching score for each of the one or more supplier profiles.

In various embodiments, each supplier profile further includes supplier client tags and/or a supplier description, and performing the keyword matching for a supplier includes: determining matches between RFI keywords and the client tags in the supplier profile; and/or determining matches between the RFI keywords and the supplier keywords in the supplier profile; and/or determining matches between the RFI keywords and the supplier description in the supplier profile.

In various embodiments, performing the keyword matching for the supplier profile includes: calculating a supplier tag score based on a number of matches between the RFI keywords and the client tags in the supplier profile; and/or calculating a supplier keyword score based on a number of matches between the RFI keywords and the supplier keywords in the supplier profile; and/or calculating a supplier description score based on a number of matches between the RFI keywords and the supplier description in the supplier profile.

In various embodiments, calculating the supplier tag score for the supplier profile includes summing the number of matches between the RFI keywords and the client tags in the supplier profile; and/or calculating the supplier keyword score for the supplier profile includes summing the number of matches between the RFI keywords and the supplier keywords in the supplier profile; and/or calculating the supplier description score for the supplier profile includes summing the number of matches between the RFI keywords and the supplier description in the supplier profile.

In various embodiments, the method includes calculating the keyword matching score for a supplier profile by summing at least two of the supplier tag score, the supplier keyword score, and the supplier description score.

In various embodiments, generating the list of candidate suppliers includes ordering the list of candidate suppliers based on the keyword matching scores.

In various embodiments, calculating a keyword matching score for each supplier on the list of candidate suppliers includes associating a numerical value for each keyword match between an RFI keyword and a supplier keyword from the corresponding supplier profile.

In various embodiments, calculating a keyword matching score for each supplier includes accumulating the numerical values for each supplier based on the keyword matching for the corresponding supplier profile.

In various embodiments, establishing the electronic profile for one or more users from an entity includes listing a set of preferred suppliers in association with the entity.

In various embodiments, establishing the electronic profile for one or more users from an entity includes listing a set of preferred suppliers in association with the user.

In various embodiments, the supplier profile comprises a plurality of elements, including a description of services offered, peer endorsement tags and, optionally, one or more of a logo, web site URL, contact information, client testimonials and social media links.

In various embodiments, the method further comprises the system providing mechanisms to enable user tagging of a supplier profile, wherein a tag is a word tag applied to the supplier profile as an electronic endorsement of the supplier via its supplier profile.

In various embodiments, the method further comprises first pass sorting the list of candidate suppliers, including putting preferred suppliers above other suppliers.

In various embodiments, the method further comprises second pass sorting the list of candidate suppliers, including determining a tag matching score for each supplier and ordering suppliers based on the tag matching score, with a supplier having the highest tag score above suppliers with lower tag scores.

In various embodiments, second pass sorting includes, if two or more suppliers tag scores match, sorting based on a number of client endorsements for each tag for each supplier, with the supplier having the highest number above the other suppliers.

In various embodiments, the method further comprises third pass sorting the list of candidate suppliers, including listing suppliers having a highest keyword matching score above suppliers with lower keyword matching scores.

In various embodiments, the method further comprises the system imposing an upper limit on the number of supplier keywords for the supplier profile.

In various embodiments, the upper limit of supplier keywords is equal to or less than 20 total supplier keywords.

In various embodiments, the upper limit of supplier keywords is 10 total supplier keywords.

In various embodiments, the method further comprises the system providing electronic mechanisms enabling a supplier to add a set of keywords representing supplier competencies as supplier keywords.

In various embodiments, the supplier profiles include a button or other user input device that enables a user to recommend the supplier by adding an endorsement tag to the vendor profile.

In various embodiments, the supplier profiles are in the field of healthcare and the supplier competencies are related to healthcare goods and/or services useful to healthcare providers.

In accordance with another aspect of the inventive concept, provided is a computer-based method of enabling selection of a supplier. The method comprises: providing a network-accessible computer system having at least one computer processor coupled to at least one non-transitory storage medium; maintaining a database including a plurality of supplier accounts, each supplier account including at least one of third-party endorsements of the supplier, the supplier's description of its services and a number of supplier keywords selected by the supplier; receiving a request for goods and/or services, the request including a number of user keywords selected by a user; comparing the number of user keywords to at least one of the third-party endorsements of the supplier, the supplier's description of its goods and/or services and the number of supplier keywords selected by the supplier; calculating a score for each of the plurality of suppliers based on a number of matches between the user keywords and the at least one of the third-party endorsements of the supplier, the supplier's description of its goods and/or services and the number of supplier keywords selected by the supplier; generating a ranking of the plurality of suppliers relative to each other based on the calculated scores; and providing the ranking to the user.

In various embodiments, the third-party endorsements are received from previous clients of a supplier.

In various embodiments, the supplier keywords are selected from a predetermined menu of keywords.

In various embodiments, the method further comprises enabling each supplier to populate its supplier account by accessing the network accessible computer system through a supplier interface module.

In various embodiments, the method further comprises providing a user interface module through which the request for goods and/or services is received from a requester.

In various embodiments, the number of user keywords is capped at a second predetermined limit.

In various embodiments, the first and second predetermined limits are the same number.

In various embodiments, the first predetermined limit and the second predetermined limit are both 10.

In various embodiments, the user interface module comprises a request form having a number of fields enabling the user to identify the user keywords.

In various embodiments, the user keywords are selected from a predetermined menu of keywords.

In accordance with another aspect of the inventive concept, provided is a system for enabling the selection of a supplier. The system comprises: a database including a plurality of supplier accounts, each supplier account including at least one of reviews of the supplier, the supplier's description of its services and a number of supplier keywords selected by the supplier; a user interface module creating a request for goods and/or services, the request including a number of user keywords selected by a user; and a transaction module. The transaction module is configured to: compare the number of user keywords to at least one of the reviews of the supplier, the supplier's description of its services and the number of supplier keywords selected by the supplier; calculate a score for each of the plurality of suppliers based on a number of matches between the user keywords and the at least one of the reviews of the supplier, the supplier's description of its services and the number of supplier keywords selected by the supplier; generate a ranking of the plurality of suppliers relative to each other based on the calculated scores; and provide the ranking to the user.

In various embodiments, the method further comprises a supplier interface module enabling each supplier to populate its supplier account by accessing the network accessible computer system through the supplier portal.

In accordance with another aspect of the inventive concept, provided is a computer-based method of enabling selection of a goods and/or service supplier by a seeker of those specific goods and or services. The method comprises: providing a network-accessible computer system having at least one computer processor coupled to at least one non-transitory storage medium; maintaining a database including a plurality of supplier accounts, each supplier account including the supplier's description of its goods and/or services and a number of supplier keywords selected by the supplier; receiving, from a user through a user interface module, a request for goods and/or services, the request including a number of user keywords selected by the user, the keywords describing characteristics of a type of good and/or service desired by the user; comparing the number of user keywords to the supplier's description of its goods and/or services and the number of supplier keywords selected by the supplier; assigning a score for each of the plurality of suppliers based on a number of matches between the user keywords and each supplier's description of its goods and/or services and between the user keywords and the number of supplier keywords selected by each supplier, a supplier having more matches between the user keywords and the supplier's description of its goods and/or services and between the user keywords and the number of supplier keywords selected by the supplier being assigned a higher score than suppliers having fewer matches; generating a ranking of the plurality of suppliers relative to each other based on the assigned scores, with a supplier having higher a score being ranked higher than a supplier with a lower score; and providing the ranking to the requester via the user interface module.

In various embodiments, each supplier account in the database further includes third-party endorsements of the supplier, and the comparing step further includes comparing the number of user keywords and the third-party endorsements of the supplier.

In various embodiments, the score for each supplier is further based on matches between the user keywords and the third-party endorsements of the supplier.

In various embodiments, the third-party endorsements are received from previous clients of a supplier.

In various embodiments, the method further comprises enabling each supplier to populate its supplier account by accessing the network accessible computer system through a supplier interface module.

In various embodiments, the number of requester keywords is capped at a second predetermined limit.

In various embodiments, the first and second predetermined limits are the same number.

In various embodiments, the first predetermined limit and the second predetermined limit are both 10.

In accordance with another aspect of the inventive concept, provided is a supplier selection and management system as shown and described.

In accordance with another aspect of the inventive concept, provided is a supplier selection and management computer program stored in at least one computer storage media and executable by at least one computer processor to perform a supplier selection and management method, as shown and described.

In various embodiments, provided is a concierge module that assists in the recommendation and selection of a goods and/or service provider. This concierge service module includes an automated component that learns from historic request patterns and other information available to the system to recommend the appropriate suppliers. This concierge service module also includes a manual component that enables a user to monitor the system-generated recommendations and assist where the automated results are, for example, insufficient.

In accordance with another aspect of the inventive concept, the automated component of the concierge service module can respond to requests through a textual messaging service, which can be built in to the application and/or provided through other channels, to respond to user requests.

In accordance with another aspect of the inventive concept, a human concierge (as a form of user) can monitor and support the automated system using the concierge service module.

In accordance with another aspect of the inventive concept, the automated component of the concierge service module can use techniques of machine learning and/or artificial intelligence to improve automated recommendations and responses.

In accordance with another aspect of the inventive concept, the automated concierge component can provide automated suggestions to suppliers to assist them in categorizing their goods and/or service offerings to improve results.

In accordance with another aspect of the inventive concept, the automated concierge module will automatically extract and recommend keywords from each supplier's website. Keywords are preferably words or phrases that are meaningful to the goods and/or services being offered, which can be based on the results of machine learning categorization of the supplier.

In accordance with another aspect of the inventive concept, the automated concierge component can automatically build a map of English words and/or phrases, where words and/or phrases with similar meaning can be graphically presented close to each other. The system can be configured to use this technological approach to broaden a search and suggest alternative tags for suppliers.

In accordance with another aspect of the inventive concept, the automated concierge component can automatically extract summaries of supplier's capabilities and contact details from websites and provide these as suggestions to suppliers and/or use these details to populate corresponding records in the system.

In accordance with another aspect of the inventive concept, the automated concierge component will automatically map suppliers onto a low dimensional space such that similar suppliers are graphically presented close to each other to allow suggesting alternative suppliers and visualizing how suppliers in a specific line of business may be related to each other.

In accordance with another aspect of the inventive concept, the automated concierge component can use machine-learning techniques to evaluate reference material that refers to suppliers to determine a sentiment of the reference material and extract any information about suppliers' capabilities. This technological capability could identify positive and/or negative views about the supplier and/or the supplier's goods and/or services.

In accordance with another aspect of the inventive concept, the automated concierge service module can be configured to use information, including extracted keyword, descriptions, and sentiments, to improve supplier recommendations.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIGS. 2A-C are screen shots of a supplier profile page in accordance with aspects of the present inventive concept;

FIGS. 3A-3C provide various exemplary screens forming part of a client user profile within the SKM system, in accordance with aspects of the inventive concept;

FIGS. 3D-3I provide various exemplary screens forming part of a client company user profile within the SKM system, in accordance with aspects of the inventive concept;

FIGS. 4A-4F are screen shots of forms used to input RFI information into the SKM system, in accordance with aspects of the present inventive concept;

DETAILED DESCRIPTION OF PREFERRED EMBODIMENTS

Figure 1A:
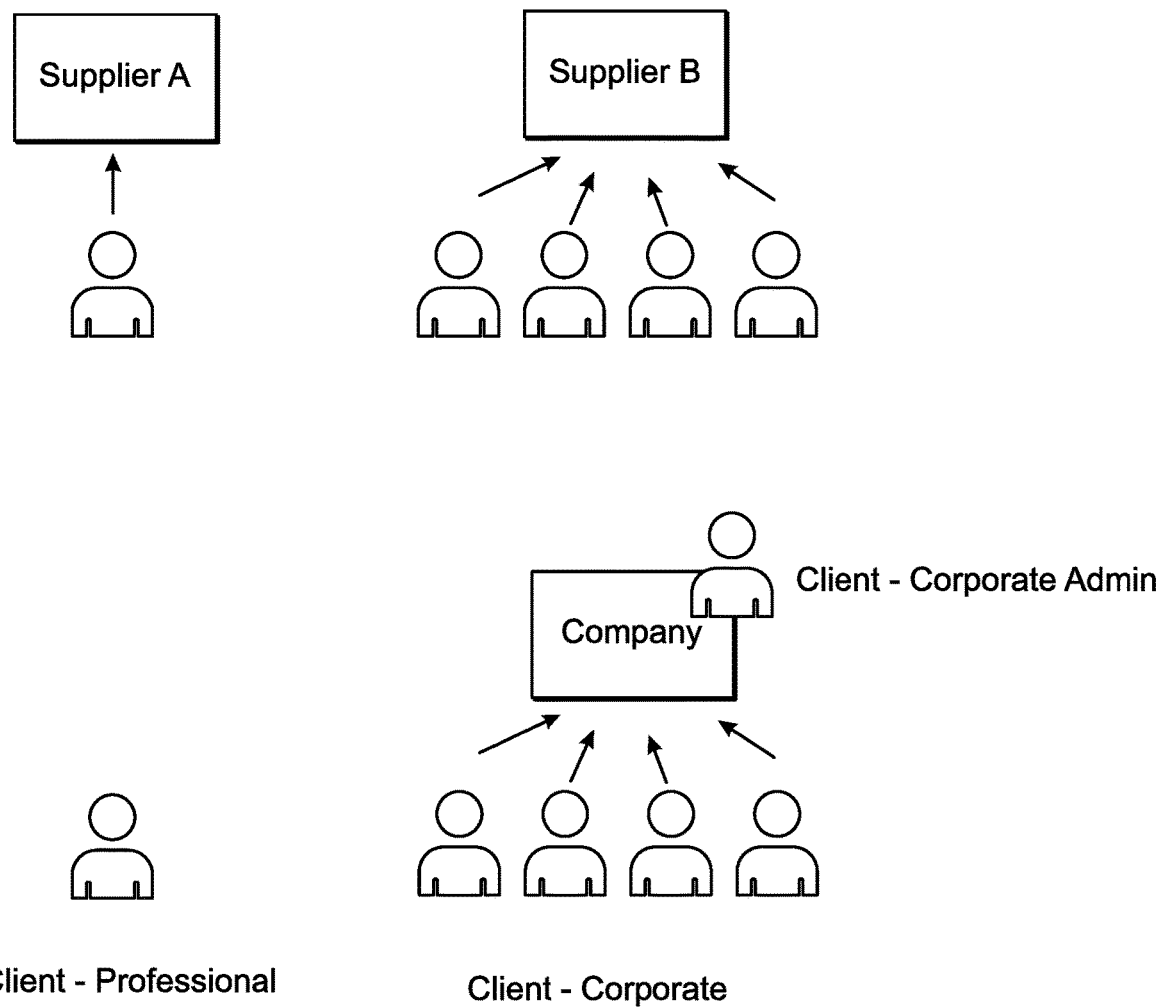
FIG. 1A is a diagram showing representations of different client and supplier users of a supplier knowledge management (SKM) computer system, in accordance with aspects of the present inventive concept.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

A computer-based supplier knowledge management (SKM) system in accordance with aspects of the inventive concept is a unique, online sourcing tool that will help entities, e.g., healthcare companies, streamline their sourcing and supplier discovery processes to make them faster, more targeted, and efficient. Using the SKM system, enterprises, for example, healthcare companies, can quickly connect with current and prospective suppliers and receive credible recommendations based on their specific requirements and criteria.

As an example, the SKM system provides the healthcare industry the most robust, credible, and intuitive supplier database that is connected in real-time. As a system, the SKM system improves healthcare companies' established supplier selection processes to make them simpler, targeted, and more efficient by quickly identifying and validating trusted suppliers that can best support their needs. Other industries can also benefit from applying the SKM system and method in their own fields. The inventive concept is not, therefore, limited to the healthcare industry.

Through the SKM system, an entity, or a user from the entity, can generate a request for information (RFI) for a specific project for which a supplier is sought. The RFI is an electronic document or file created to search for suppliers that can satisfy the project need. The SKM system can process the RFI to return a list of candidate suppliers that could potentially satisfy the project need. The list can be an ordered list that reflects matching and sorting performed by comparing the content of the RFI with content of electronic supplier profiles. The user (or entity) could then electronically solicit presentations from the listed suppliers.

Based on the returned list of candidate suppliers, the entity that generated the RFI can also review the listed suppliers' profiles and invite these candidate service providers to electronically submit a tailored presentation in response to a published RFI. The presentation should be focused on how the supplier can fulfill the entity's specific business need expressed in an RFI. A preset limit can be placed on the presentation, such as limiting a number of slides in a presentation. For example, a limit of ten (10) slides could be placed on such presentations. Other such limits could be set in other embodiments.

When such slide (or page) limits are set, the SKM system could be configured to monitor and enforce the limits. For example, the system could electronically analyze the electronic presentation, determine its slide or page count, and reject a presentation that exceeds the limit, with an electronic warning or other notification back to the supplier that submitted the presentation.

In some embodiments, the SKM system could be configured to supply a template for such presentations. The template could include predefined fields that enable the company to solicit certain information from prospective suppliers. Such information could include, if appropriate for the company's need, cost information, possibly including a payment schedule, delivery and/or scheduling information, deliverable information, information descriptive of the services and/or goods of the supplier, information identifying past projects (such as those with the company); a list of references, and so on. In some embodiments, the template can be configurable by the company or user for a specific project request (or RFI).

The SKM system could be configured to parse information from the presentations, particularly if templates are used, and generate analytical and/or comparative reports for the entity soliciting the presentation based on supplier information from two or more supplier presentations, e.g., comparing costs, schedules, and so on.

Note, in the figures, the SKM system and a user's profile within the SKM system are sometimes referred to as "tealbook." Tealbook™ is a trademark of Tealbook, Inc. Canada. In the figures and the specification, a validation expertise tool (VET) refers to a supplier evaluation module that searches and recommends suppliers for a client entered RFI. VET™ is a trademark of Tealbook, Inc. Canada. In the figures and the specification, the term "tealboard" is sometimes used to refer to a client user page within the SKM system that aggregates and organizes social media information for the user, e.g., from Twitter, Facebook, LinkedIn, and the like. Tealboard™ is a trademark of Tealbook, Inc. Canada.

FIG. 1 is a diagram indicating an embodiment of different types of users of the SKM system, in accordance with aspects of the inventive concepts. Generally speaking, the SKM system has two distinct types of users, in the preferred embodiment: suppliers and clients. A "Supplier" is a user that wants the company/entity s/he works for to be discovered and connected to clients through the SKM system (or platform). A "Client" is a user that wants the company s/he works for to discover, search, and stay connected with suppliers through the SKM system (or platform).

In some embodiments, the client user category can be further split in three sub categories which are:

Professional: User for which the company s/he works for does not have a corporate membership. Professional user accounts of people working for the same company are not linked together and data is not shared between professional users.

Corporate: User for which the company s/he works for has a corporate account membership. Corporate users are able to see valuable information from other profile pages of users of the same company.

Corporate admin: User that manages corporate membership of a company, including a corporate profile.

In FIG. 1A, the Supplier is shown either as a single user entity (left) or multi-user entity (right). For example, a multi-user entity can be an entity that provides different types of services through different departments, divisions, subsidiaries, and/or locations.

Figure 1B:
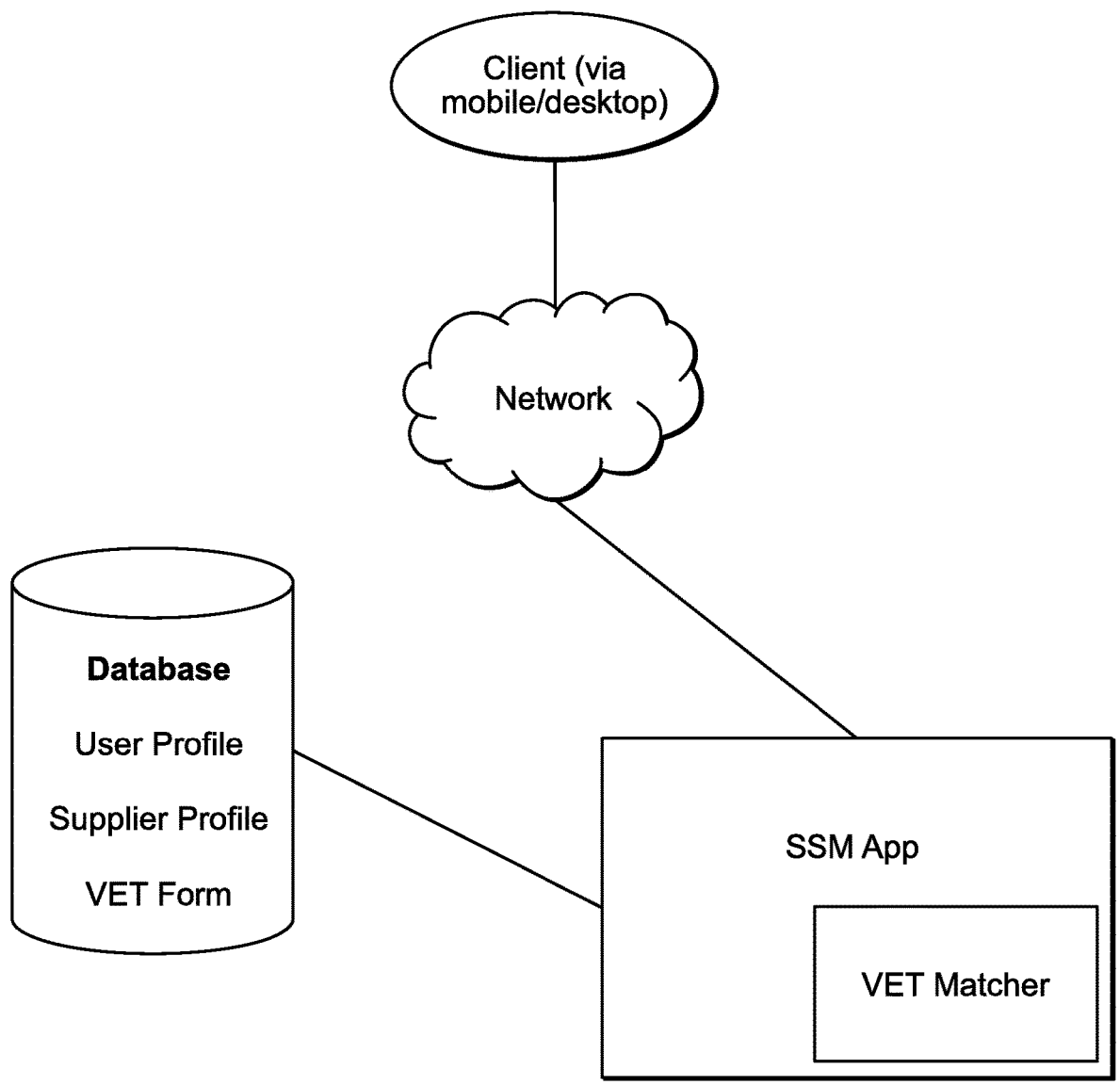
FIGS. 1B-D provide diagrams illustrating computer aspects of the SKM system, in accordance with aspects of the present inventive concept.

FIG. 1B provides a diagram of general SKM system overview. The SKM system provides a digital platform that can be used either from mobile devices or computers. Users connect through the Internet to a web server where the SKM application resides. The SKM application in turn communicates with the database to get and store the relevant information.

Figure 1C:
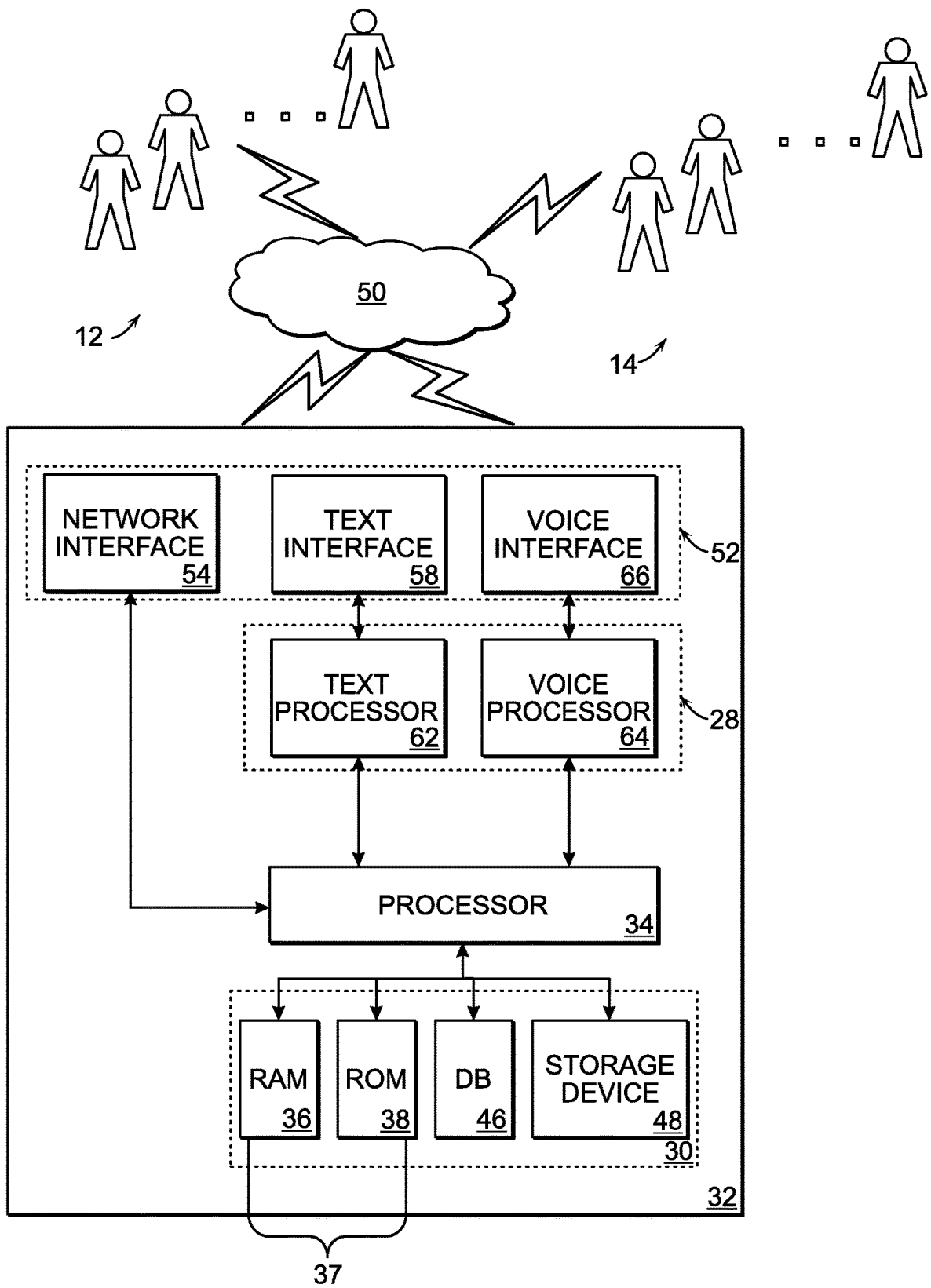

FIG. 1C is an exemplary block diagram of a more detailed computer architecture of a representative computer system within which a supplier knowledge management system (see FIG. 1B) may be implemented. The computer system 32 includes at least one processor 34 (e.g., a central processing unit (CPU)) that retrieves and processes data and other forms of electronic information from a computer storage system 30. As will be appreciated by those skilled in the art, while computer system 32 is shown with a specific set of components, various embodiments may not require all of these components and could include more than one of the components that are included, e.g., multiple processors. It is understood that the type, number and connections among and between the listed components are exemplary only and not intended to be limiting.

In the illustrative embodiment, processor 34 is referred to as CPU 34, which may include any of a variety of types of processors known in the art (or developed hereafter), such as a general purpose microprocessor, a digital signal processor or a microcontroller, or a combination thereof. CPU 34 may be operably coupled to storage systems 30 and configured to execute sequences of computer program instructions to perform various processes and functions associated with the SKM system, including the storing, processing, formatting, manipulation and analysis of data associated with the system (e.g., user keywords, supplier keywords, supplier service description, tags, supplier client reviews (described below)). The computer program instructions may be loaded into any one or more of the storage media depicted in storage system 30. One illustrative embodiment of functional modules embodying such computer program instructions is provided in FIG. 1D.

Storage system 30 may include any of a variety of semiconductor memories 37, such as, for example, random-access memory (RAM) 36, read-only memory (ROM) 38, a flash memory (not shown), or a memory card (not shown). The storage system 30 may also include at least one database 46, at least one storage device or system 48, or a combination thereof. Storage device 48 may include any type of mass storage media configured to store information and instructions that processor 34 may need to perform processes and functions associated with the supplier selection system. As examples, data storage device 48 may include a disk storage system or a tape storage system. A disk storage system may include an optical or magnetic storage media, including, but not limited to a floppy drive, a zip drive, a hard drive, a "thumb" drive, a read/write CD ROM or other type of storage system or device. A tape storage system may include a magnetic, a physical, or other type of tape system.

While the embodiment of FIG. 1C shows the various storage devices collocated, they need not be, as they could be remote to each other, to processor 34 or both. Storage system 30 may be maintained by a third party, may include any type of commercial or customized database 46, and may include one or more tools for analyzing data or other information contained therein.

As an example, database 46 may include any hardware, software, or firmware, or any combination thereof, configured to store data. Specifically, database 46 may be configured to store data and information representative of one or more of a plurality of users 12, one or more of a plurality of suppliers 14, or both, as well as associated data and information. In some embodiments, database 46 may include one or more fields, wherein a field may be an element of a database record in which one piece of a particular type of information may be stored. In particular, a field may be configured to store an element of data representative of one or more of the users 12, one or more of a plurality of suppliers 14, or both.

Computer system 32 may include or interface with one or more security systems (not shown), configured to at least partially restrict or control access to one or more components of computer system 32. Security systems may include hardware, software, firmware or a combination thereof, such as, for example, a firewall, password protection software, user authentication software, encryption software and the like. In some embodiments, security systems may be configured to limit a function of the supplier selection system, limit access to data associated with the supplier knowledge management system, or both. In some embodiments, computer system 32 may be configured so that select data contained within storage system 30 may be inaccessible to one or more of the users 12 and/or suppliers 14.

Computer system 32 may include a network interface system or subsystem 54 configured to enable interactions between the plurality of users 12 and suppliers 14 via one or more networks 50. As such, computer system 32 may be configured to transmit or receive, or both, one or more signals related to the functions of the supplier knowledge management system. A signal may include any generated and transmitted communication, such as, for example, a digital signal or an analogue signal. As examples, network 50 may be a local area network (LAN), wide area network (WAN), virtual private network (VPN), the World Wide Web, the Internet, voice over IP (VOIP) network, a telephone or cellular telephone network or any combination thereof. The communication of signals across network 50 may include any wired or wireless transmission paths.

To enable communications via network 50, computer system 32 may include a set of interfaces 52 and a set of processors 28, 34. The set of processors 28 may include a text processor 62 and a voice processor 64, along with CPU 34. The set of interfaces may include a network interface 54, a text interface 58 and a voice interface 66, as shown in this embodiment. As mentioned above, network 50 may represent a combination of networks configured to transmit and receive communications with computer system 32, via any of the set of interfaces 52.

CPU 34 may be operably coupled to network interface system 54 for exchanging typical computer network information, e.g., via the Internet, a LAN, WAN, VPN or some combination thereof. Network interface system 54 may be configured to permit communication between and among the users 12, suppliers 14 and computer system 32, for example using an Internet protocol (IP) or other network-based protocol. In such cases, network interface system 54 may be configured to utilize TCP/IP, HTTP, DNS or any other application, transport, network, or link protocol, or combination of the foregoing.

Text interface 58 may be operably coupled to a text processor 62 configured to process received text message and text messages to be transmitted. Text interface 58 may be configured to permit text-based communication between users 12 and computer system 32. For example, in combination, text interface 58 and text processor 62 may include functionality to communicate with a two-way pager, a personal digital assistant (PDA), a cell phone, a computer, a laptop, a tablet, a terminal, or any other suitable electronic device, whether wired or wireless. Text processor 62 may include an email system configured to transmit, receive, or process, email messages or a combination thereof. Text processor 62 may also include an instant-messaging (IM) system, a two-way paging system or other system configured to transmit, receive, or process, or a combination thereof, text-based information. As will be appreciated by those skilled in the art, such systems may also provide mechanisms for transferring files between devices. Such files may include any of a wide variety of content.

Voice interface 66 may be operably coupled to a voice processor 64 configured to process received voice information and voice data to be transmitted. Voice interface 66 may be configured to permit voice-based communication between and among the users 12, suppliers 14 and computer system 32. For example, in combination, voice interface 66 and voice processor 64 may be configured to enable interaction with a cell phone, a fixed-line telephone, a VOIP device or other similar device, or combinations thereof. For example, voice interface 66 may be configured to transmit, receive, or both, digital or analog signals using wired to wireless communications devices and systems, such systems may include telephone, cellular telephone and VOIP systems, as examples.

In some embodiments, the operable connections between components of computer system 32 may be other than as shown in FIG. 1C. For example, data storage system 30 may be operably connected to communication processors 28 or interfaces 52, or both, such that users from the plurality of users 12 and suppliers 14 may modify data stored in data storage system 30 using such interfaces and processors.

In various embodiments, systems that may be associated with the SKM system may include one or more systems configured to provide additional functions associated or useful in conjunction with the supplier knowledge management system. For example, systems associated with the SKM system may include a tracking system (not shown) configured to track the participation, selection and performance of suppliers. Computer system 32 may be configured to transmit one or more signals to one or more systems associated with the SKM system. For example, a system associated with the SKM system may be configured to receive signals or data transmitted by computer system 32 wherein the signal/data may affect a function of the system associated with the SKM system. External systems could include, as examples, various social media systems.

It is also contemplated that the SKM system may be implemented using one or more computer systems 32. For example, various embodiments of a SKM system may include a plurality of computer systems 32, components of computer system 32, or other systems associated with the SKM system. It is also contemplated that one or more SKM system may be configured to operate independently of other SKM systems based on a language, an organization, a geographic location, or other requirement.

Figure 1D:
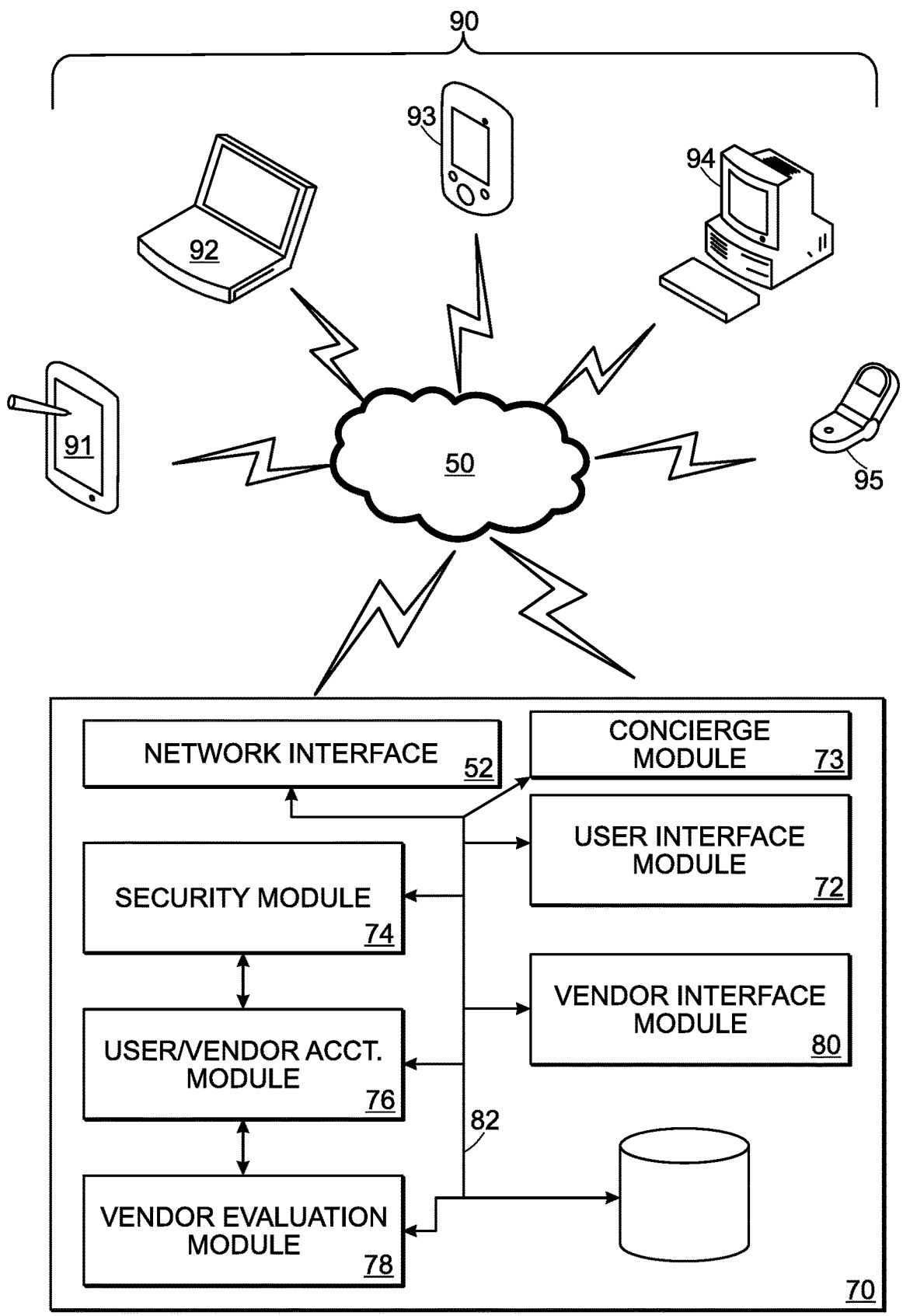

FIG. 1D is a block diagram of an embodiment of a SKM system 70 that may be implemented using the computer system 32, as an example. SKM system 70 can include a variety of functional modules that communicate via a communication path 82, (e.g., a bus or a network). SKM system 70, as discussed with respect to FIG. 1C, may communicate with a set of users (e.g., users 12 and suppliers 14 from FIG. 1C) via network 50. In various embodiments, the users may access the SKM system 70 using any of a variety of wired or wireless devices 90. Such devices may include an electronic tablet 91, laptop computer 92, a PDA 93, a personal computer 94 or a cell phone 95, as examples.

The SKM system 70 may include a user interface module 72 and supplier (or vendor) interface module 80 that may be configured to receive RFIs, profile information, and/or other account inputs from users 12 and suppliers 14, respectively, and prepare information or content to be output via any of devices 90. Such information or content may be configured to be provided within a browser or window environment, and could include, as example, text, graphics, video, audio or the like. More specifically, information presented on the devices 90 may include information representing users 12, suppliers 14, information related to RFIs, supplier recommendations, and supplier performance, or other information associated with the supplier knowledge management system. User interface module 72 and supplier module 80 may also prepare information received via network interface 52 for use by the other modules of the SKM system 70.

A security module 74 may be included if access to SKM system 70 and databases 30 are to be protected. As examples, security module 74 may include functionality to authenticate a user or supplier before allowing such access, such as by logging in using password protection. A user/supplier account module 76 may be included to permit the setup and management of user and supplier accounts and profiles, which may be stored in database 30. A user account may include information identifying the user, such as name, address, e-mail address and so on. A supplier account may include information identifying the supplier, such as name, address, e-mail address and so on, as well as a description of offered services, keywords indicating competencies, other user (client) endorsements or "tags," and other information, as described below.

A supplier (or vendor) evaluation module 78, or validation expertise tool (VET), is also included and provides the primary functions associated with request for information (RFI) generation and identification, sorting, and ranking of suppliers based on RFI inputs received from a user, suppliers' self-selected keywords, suppliers' self-descriptions and endorsements (tags) of the suppliers by their clients. As described more specifically below, the supplier evaluation module 78, based on criteria received from a user pertaining to the type of service desired by the user, operates to compare the received criteria to various information associated with each supplier and generates a ranked list of suppliers to the user. The ranked list presents suppliers having qualifications, recommendations, etc. to the user that closely match the needs of the user. The user is then able to further pursue an engagement inquiry with one or more of the suppliers.

A concierge module 73, or concierge service module 73, can be included to assist user's in obtaining recommendations of suppliers, such as providers of goods and services. It can also be used to help profiles of suppliers be generated and/or updated within the SKM system. The concierge module 73 can interact and exchange information with other modules of the SKM system 70. The concierge service module 73 can be configured to assist in providing the recommendation and selection of a goods and/or service providers.

The concierge service module 73 can include an automated component and a manual component, in various embodiments. The automated component can be configured to learn from historic request patterns and other information available to the SKM system 70 to recommend appropriate suppliers. The manual component can be configured to enable a user to monitor the system-generated recommendations and assist where the automated results are, for example, insufficient.

In various embodiments, the automated component of the concierge service module 73 can be configured to respond to requests for suppliers through a textual messaging service, which can be built into the application and/or provided through other channels, to respond to user requests, e.g., using text interface 58 and text processor 62.

In various embodiments, a human concierge (as a form of user) can monitor and support the automated component using the concierge service module 73.

In various embodiments, the automated component of the concierge service module 73 can use techniques of machine learning and/or artificial intelligence to improve automated recommendations and responses for clients and suppliers.

Using such learning, the automated component can provide automated suggestions to suppliers to assist them in categorizing their goods and/or service offerings to improve results. In various embodiments, the automated concierge module can be configured to automatically extract and recommend keywords from each supplier's website. Keywords are preferably words or phrases that are meaningful to the goods and/or services being offered by the supplier, which can be based on the results of machine learning categorization of the supplier.

In various embodiments, the automated component can automatically build a map of English words and/or phrases, where words and/or phrases having similar meanings can be graphically presented on a display close to each other to facilitate selection by the supplier. The system can be configured to use this technological approach to broaden a search and suggest alternative tags for suppliers. In various embodiments, the automated concierge component can automatically extract summaries of supplier's capabilities and contact details from websites and provide these as suggestions to suppliers and/or use these details to populate corresponding records in the SKM system.

In accordance with another aspect of the inventive concept, the automated concierge component can be configured to automatically map suppliers onto a low dimensional space such that similar suppliers are graphically presented close to each other to allow suggesting alternative suppliers and visualizing how suppliers in a specific line of business may be related to each other.

In accordance with another aspect of the inventive concept, the automated concierge component can use machine-learning techniques to evaluate reference materials, such as from online sources, that refer to suppliers to determine a sentiment of the reference material and extract any information about the suppliers' capabilities and/or reputation. This technological capability could identify positive and/or negative views about the supplier and/or the supplier's goods and/or services.

In accordance with another aspect of the inventive concept, the automated concierge service module can be configured to use information, including extracted keywords, descriptions, and sentiments, to improve supplier profiles and recommendations.

As will be appreciated by those skilled in the art, the modules present in FIG. 1D are merely illustrative. Other embodiments could use different modules that implement the disclosed functions in other manners, or could combine modules shown.

As set forth above, the inventive concept utilizes information received from a user/entity and performs "matching" and "sorting" functions to select and rank suppliers that best fit the criteria input by the user in the RFI. Preferably, in some embodiments, the SKM system is subscriber-based, both for the user and the suppliers. In the case of users, a user may be an individual, working as a sole practitioner or within a corporate entity, for example, or a corporate (or multi-user) entity that maintains a subscription and enables individual users within the entity to access the corporate account for the purpose of vetting and selecting suppliers, see, e.g., FIG. 1A. In the case of a corporate or multi-user entity subscriber, users within the entity are able to view and utilize information input by other users within the entity. Further, in the case of a corporate or multi-user entity, an administrator may manage the membership of the entity.

In the case of suppliers, suppliers are able to input information about the services and/or goods they offer into data storage system 30 via supplier interface module 80. The input information can be used to create a supplier profile, which can serve as the supplier's presence within the SKM system and community enabled thereby. The supplier profile may take the form of a web page including all of the supplier information in a format that presents a user-friendly presentation of the supplier to the user.

Figure 2A:
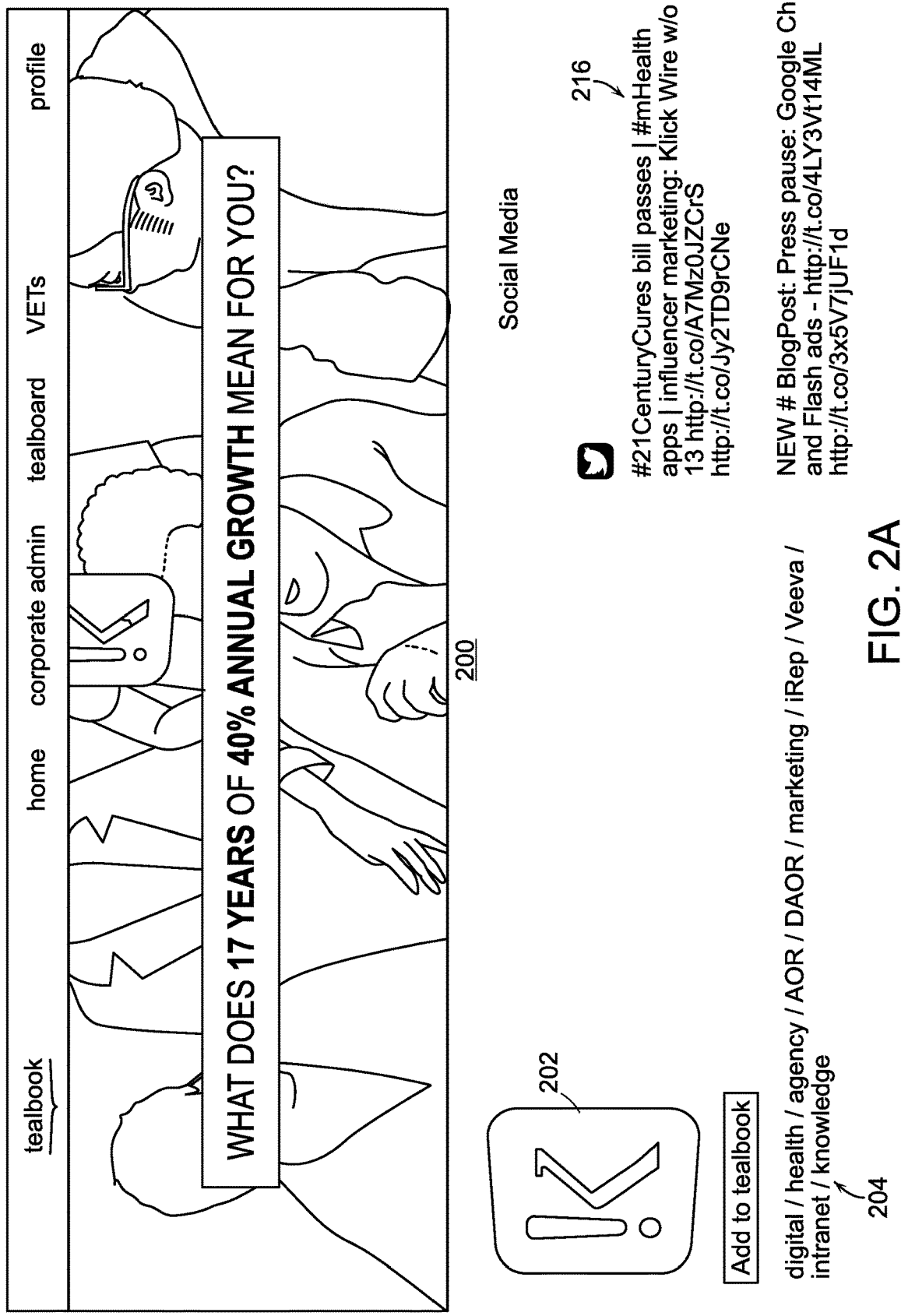

FIGS. 2A-C shows an example of a supplier profile page 200 created within the SKM system by a supplier. Each supplier can create and update a public profile that can be viewed by clients. In various embodiments, the supplier profile page 200 can include one or more of the supplier name, website URL, primary and secondary contact information, and a description of the supplier, including a listing of services offered and specific disciplines within which the services are offered, a brief presentation or slide show showcasing its services, as well as a company logo. The supplier information and content may be presented in the form of a supplier profile within the SKM system.

In some embodiments, the supplier can also select a fixed number of individual supplier keywords to describe itself and/or the services and strengths that it offers. In one embodiment, the number of supplier keywords is limited to ten. It will be understood, however, that the particular number of supplier keywords is not critical to the invention, and any upper limit to the number of supplier keywords may be implemented. By having a limit, the system imposes practical constraints on supplier inputs, which improves evaluation and selection of suppliers by the soliciting entity (e.g., company or company representative). These supplier keywords may be words input by the supplier or, in other embodiments, selected from a prepopulated listing.

As shown in FIGS. 2A-C, supplier profile page 200 can include the name and/or logo 202 of the supplier. The supplier-selected keywords are shown at 204 and the supplier description is shown at 206. The description 206 can be a free text input in sentence and paragraph form, whereas keywords can be single words or short phrases. Client endorsements or tags are shown at 208. Client tags are words or phrases that are input by users of the supplier selection system 70 that have used the services offered by the supplier. Client tags may be words or phrases input by the user or, in other embodiments, selected from a prepopulated listing. The supplier profile may include mechanisms that enable a user to endorse the supplier be selecting or adding a tag.

Supplier contact and other information are shown at 210, a general description of offered services is shown at 212 and a generic description of the types of the supplier's clients is shown at 214. In addition to the general and specific information shown in the supplier profile, in various embodiments, live social media feeds of the supplier are included in the profile, as shown at 216. As described in detail below, the general and specific information included in the supplier profile is utilized by the SKM system to direct users of the system to suppliers that meet the criteria set forth by users for particular engagements.

In accordance with the inventive concept, a key element can be the limited description imposed by the SKM system, e.g., 10 words in this embodiment, which is unique to the SKM system in the supplier profile process. Although the supplier profile contains various elements, such as the description, logo, etc., that can be seen in other web application, the process of establishing a description in single words or short phrases and applying an upper limit has not been seen. With this upper limit, it forces suppliers to use very specific words to define themselves. This helps client users to easily scan supplier profiles previews and understand their capabilities and strengths. Another key aspect is that the 10 words are used in the SKM system's algorithm to match suppliers against clients' business needs, expressed in RFIs issued for client projects.

As each supplier subscribes to the SKM system and populates its supplier profile through the supplier interface module 80, the profiles are stored in databases 30 maintained by the system. A user (e.g., from a soliciting entity/company) is able, through user interface module 72, to browse supplier profiles to review services offered by suppliers in the system, as well as the supplier keywords, client tags, supplier description, etc. included in the supplier profile. The user is able to add suppliers to a customized user supplier directory for easy access to the profiles when particular services are sought. Adding a supply to a user or entity directory may also cause the SKM system to treat the supplier as a preferred supplier. The supplier searching performed by the SKM system can give preference to a user's or entity's preferred suppliers for a particular RFI.

When a user selects a supplier for inclusion in its or its company's directory, the user is prompted to select a number of client tags to associate with the supplier and the supplier services. These client tags are used both as filters for the user to conduct searches of suppliers and by the supplier evaluation module, or validation expertise tool, 78, as described below. While these client tags are listed in the supplier profile, in various embodiments, the supplier of each client tag is not disclosed to non-related users (i.e., users that are not part of a specific corporate entity). As set forth above, client tags may be words input by the user or, in other embodiments, selected from a prepopulated listing. As shown at 208 in FIGS. 2A-C, as users select client tags to be associated with a supplier, the client tags are then included in the supplier profile. In this way, multiple users are able to contribute, in a "crowd sourcing" manner, to the supplier profile, in order to enable the SKM system to further fine-tune the supplier selection process, as described below.

Figure 3A:
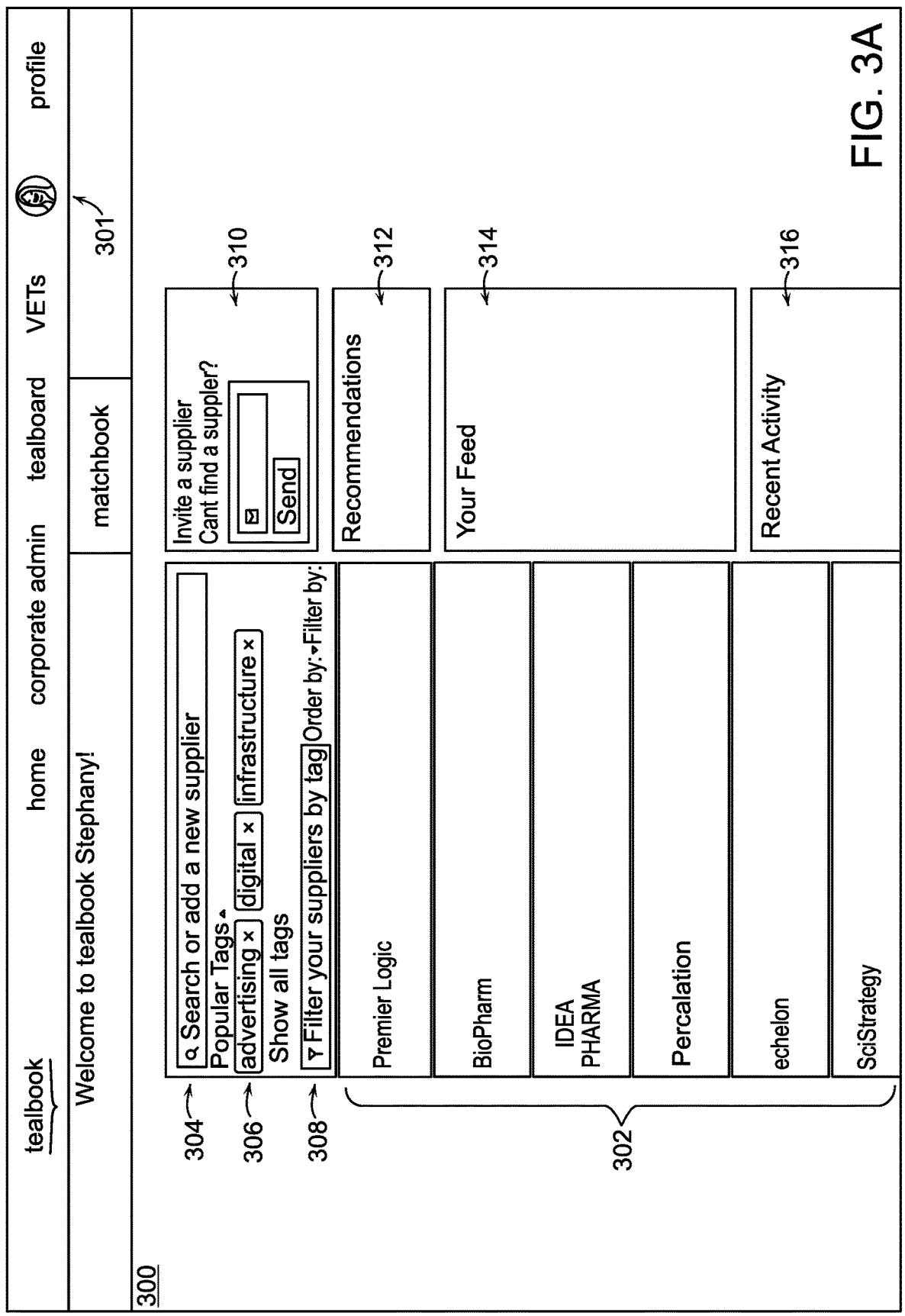

FIG. 3A shows an example of a client user's contacts page 300. Clients can add as many suppliers as they want to their contacts page, as part of the client's profile within the SKM system.

Client profile page 300 includes an identification 301 of the user to which the profile belongs, including name and photo in this example. A list of suppliers 302 that have been entered by the user is presented in a central region of the page. In the list of suppliers, the supplier name and logo are shown along with a 10 word description entered by the supplier via its supplier profile page.

A search box 304 is provided to enable the user to search its database of suppliers. The user can add and/or remove one or more tags 306, such as the shown single word or short phrase (e.g., 2-word) tags. The tags can be used for searching for or otherwise filtering suppliers. A set of user options 308 are provided to enable the user to filter its supplier search results.

The right column shows a variety of additional information and or utilities made available to the user on its profile page by the SKM system in this embodiment. An "Invite a Supplier" region 310 includes mechanisms to enable a user to invite a supplier to join the SKM system, which may be a precursor to adding the supplier to the user's list of suppliers. This mechanism enables an electronic communication (e.g., email) to be sent to a supplier contact. Options for viewing pending invitations are also provided here, in this embodiment.

A "Recommendations" region 312 enables a user to initiate an RFI using the VET (see below). A "Your Feed" region 314 enables the user to include one or more social media feeds in its profile, such as from its suppliers. The feeds can allow the user to see recent tweets, posts and the like from social media sources, for example. A "Recent Activity" region 316 enables a user to view recent activity, e.g., from its suppliers or others, within the SKM system.

FIG. 3B shows a page 340 useful for a client user adding a supplier via the client's profile. This screen can be rendered by the user searching suppliers and then selecting a supplier, here Odessa. When clients add a supplier to their profile, they are prompted to tag the supplier with unique words identifying the supplier they are adding (e.g.: digital, creative, training, etc.), see tag field 342. A dropdown box 344 or other mechanism may be included to assist the user in adding tags. Tags are then used by the client to easily filter their list of suppliers within their profile. The tags can be single word (e.g., "digital") or short phrases (e.g., "exhibit design"), similar to keywords.

Tag information is leveraged in a unique way as this data is used by the Validation Expertise Tool (VET) algorithm within the SKM system, as described in detail below. Clients define and categorize suppliers with the tags based on their experience with the supplier and then the SKM system uses that information in its VET algorithm to provide precise and accurate supplier recommendations.

Screen 340 also enables a user to indicate its experience with a supplier, in relationship region 344. In this embodiment, there are three radio button options shown for user selection. Like the tags above, this information is used in the matching and sorting algorithms associated with the VET process, as described below. When the user has completed the tags and relationship information, selection of button 346 adds the supplier to the client user's profile.

FIG. 3C is an example of a screen 360 associated with a user's profile. The screen 360 ("tealboard") provides a single page that aggregates social media for the user. It enables the client to view the suppliers' social media posts, in social media region 362. For example, in this embodiment, it is possible to see the Twitter, Facebook and LinkedIn social media posts from various suppliers.

Using a filtering capability 364, the user can filter results to see only his suppliers, the suppliers added by colleagues within his company, or all SKM system suppliers. It is also possible to filter by keyword or company name, in field 366.

FIGS. 3D-3I provide various exemplary screens forming part of a client company user profile within the SKM system, in accordance with aspects of the inventive concept. The SKM system has a corporate admin module that enables procurement and sourcing managers to have complete overview of what is happening within the system for their company.

An Employees feature 372 renders screen 370, which allows the admin to view the list of all employees that are linked to the company within the SKM system. It is possible to quickly view how many suppliers they have added to their corporate account, and to grant/remove an admin role. The screen includes a list of employees by name, email, position, department, number of suppliers in their client user accounts, and an indication of whether or not they have admin privileges.

The corporate admin can also click on a user to view the list of suppliers s/he added and the tags s/he used for each suppliers, shown in the screen 375 in FIG. 3E.

Figure 3F:
Figure 3H:
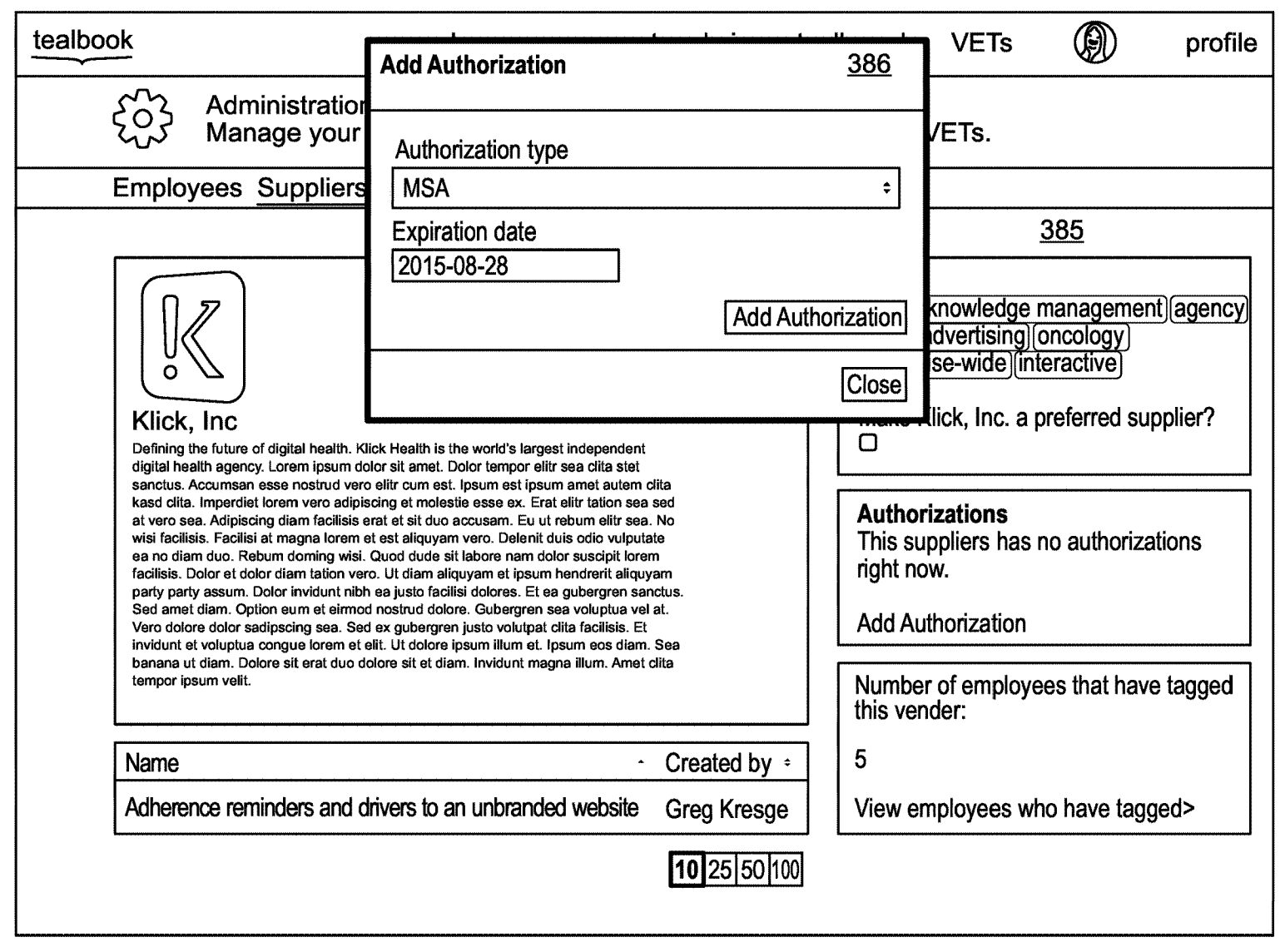
Figure 3I:
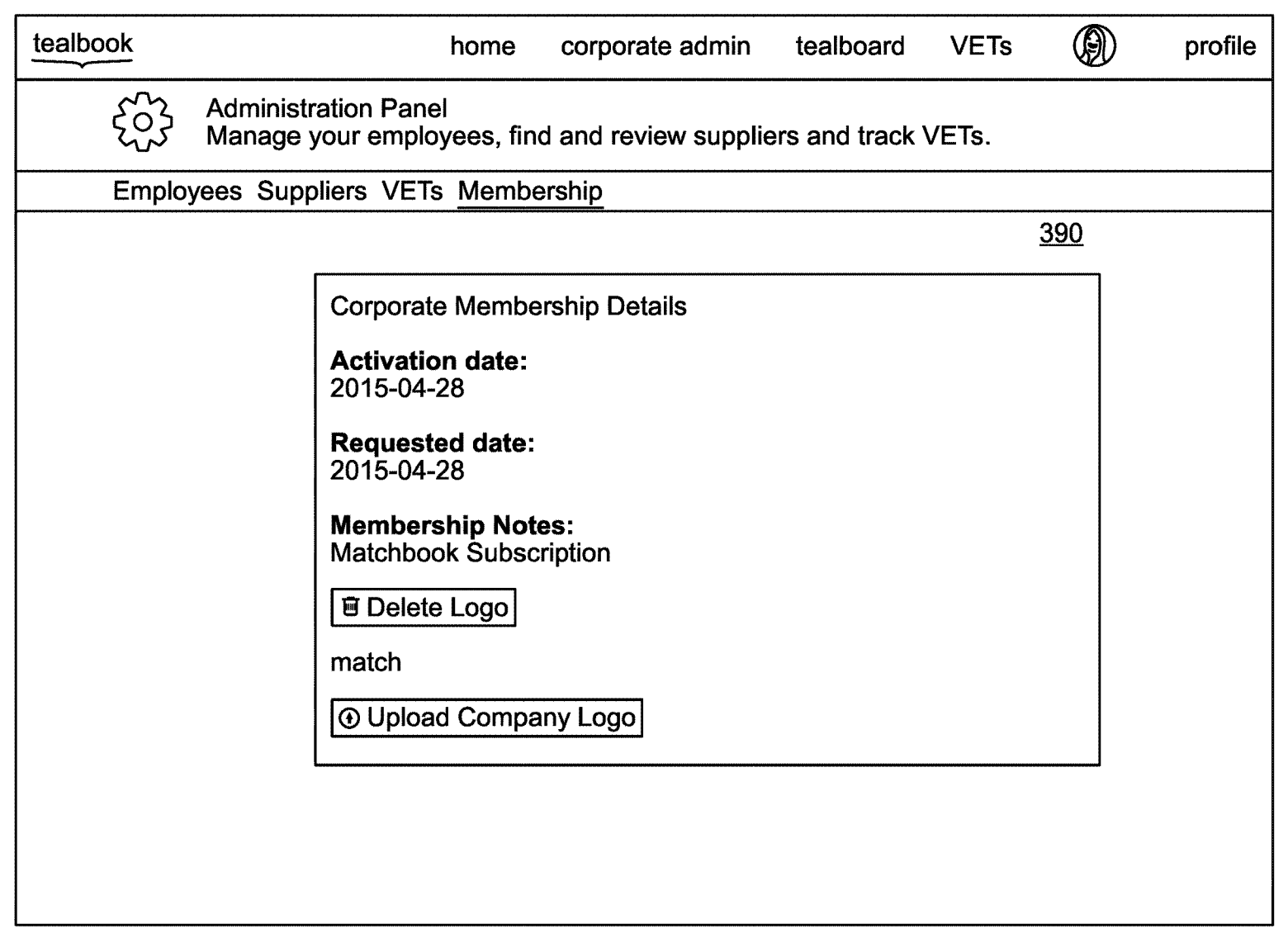

Referring to FIG. 3F, the Suppliers feature 374 renders a screen 380 that provides a supplier list that gives the corporate admin an ability to access the list of all suppliers added by employees of the company and to filter that list by the tags used by the employees to define the suppliers. The list can also include authorizations, as described below.

Every supplier in the list can be "clicked" to access the information about the supplier, shown in screen 385 of FIG. 3G. The information displayed can include: Logo, Name, Description, List of VETs they have responded to, List of tags, Number of employees who have tagged the supplier, as in the example of FIG. 3G. From screen 385, it is also possible to mark the supplier as a "preferred" vendor (see checkbox) or to add authorizations if there are MSA (Master Services Agreement), CDA (Confidential Disclosure Agreement), and/or the like in place that apply to the supplier.

Selecting the "Add Authorizations" option in screen 385 causes a corresponding pop-up box 386 to be rendered. The box 386 enables a user to indicate a type of authorization, here "MSA" in this example. An expiration date can also be included, which could be the date of the termination of the MSA. The inventive concept is not limited to this combination of information for reflecting or noting authorizations.

Using the VETs feature 376, the corporate admin has access to all the VET RFIs (or "VETs") of its employees for the company. The admin can easily view the RFIs generate using the VET that are pending approval and the VET RFIs that have been approved. Preferably, a VET RFI that needs approval is a VET RFI that is ready to be sent to suppliers. However, in order to invite those suppliers to respond to the VET RFI, a corporate admin needs to approve the suppliers, in the preferred embodiment.

Selecting the Membership feature 378 renders a Corporate Membership Details screen 390. The corporate admin has access to all the VET RFIs. The membership detail page provides information regarding when the company has acquired the corporate subscription. In some embodiments, the corporate subscription is a paid subscription. This screen can also be used to enable deletion and addition of a corporate logo, in some embodiments.

Referring now to FIGS. 4A-F, which illustrate embodiments of screens that provide forms associated with the inventive concept of the SKM system, in particular the process of creating a RFI by a user is described in the context of a project. The screens walk a user through a series of VET steps that provide mechanisms of the input of information necessary to generate the RFI. A menu of VET Steps displayed on the left side of each screen provides an overview of the process steps, completion of steps (with checkmarks), and could also be used for navigation by selecting a step. Navigation from one screen to the next can occur by selection of a "Next Step" button at the bottom of each screen.

As described below, VET is a detailed form for which the clients (users and user entities) can input a variety of specifics about a business need, within the scope of a project for which a supplier or supplier is sought. In this embodiment, the specific information that can be input by a user includes:

project name
good and/or service type
project type
business function
product name
therapeutic area (e.g., medical/healthcare companies)
location
overview
challenges
desired outcomes
deliverables
target audience
criteria
budget While certain specific fields within each screen are described, it will be understood that the purpose and number of required fields can vary, based on a number of factors associated with the user and/or the field of endeavor within which the particular goods and/or services are sought. As described further below, the RFI creation process may be performed once for a particular project. In other words, the RFI created in this process will include information necessary for the system to select and rank suppliers and to provide a detailed record of the project for future reference. Further, the information collected in this process becomes the RFI that is eventually sent out to suppliers selected as a result of the SKM system. Preferably the entire process occurs electronically within the SKM system and community created thereby.

FIG. 4A an embodiment of a screen 400 useful in the initial step of an RFI creation process, and is associated with the selection of option "Name and Need" in a left hand menu entitled "VET Steps." The screen is an interface to a VET functionality of the SKM system. In field 402, the user acting on behalf of an entity seeking services and/or goods is prompted to enter a number of RFI keywords to identify the services and/or goods and supplier qualifications desired by the user. In one embodiment, the number of RFI keywords is limited to a maximum of ten, although any upper or lower limit may be set. Similar to the entry of supplier keywords and user tags, RFI keywords may be words input by the supplier or, in other embodiments, selected from a prepopulated listing. Field 404 is for entry of a title for the supplier search. The information input to fields 402 and 404 are for the purpose of identifying the particular supplier search being performed, for inclusion in the final search results and/or for later reference.

Fields 406-416 are for inputting information specific to the project. In field 406, the user is prompted to identify the goods and/or services and supplier qualifications desired by the user. In field 406, the user may enter a set of keywords (e.g., which can also be considered RFI keywords) identifying the desired goods and/or services, for example. In some embodiments, the number of keywords can have a limit. For example, an upper limit can be ten keywords, although a different limit may be set in other embodiments. Again, similar to the entry of supplier keywords in field 402 and user tags described above, these keywords may be words input by the supplier or, in other embodiments, selected from a prepopulated listing.

In field 408, the particular need of the user may be input words relating a need supported by the project. Examples of this are a product launch, clinical trial, etc. Terms or phrases relating to the business function that the project is supporting may be input to field 410, relating to a product of system that the project is supporting may be input to field 412, and relating to a specific therapeutic area of practice that the project is supporting may be input to field 414. Finally, a location of the project may be entered in field 416, which may be the location at which services are to be provided, goods shipped, and so on.

FIG. 4B illustrates an embodiment of a screen 420 of further step of the RFI creation process, and is associated with the selection of option "Overview" in the left hand menu entitled "VET Steps." In field 422, a brief summary of the requirements and expectations may be input and, in field 424, specific challenges foreseen by the user may be input. These may be free text input fields.

FIG. 4C illustrates an embodiment of a screen 430 of a further step of the RFI creation process, and is associated with the selection of option "Outcomes" in the left hand menu entitled "VET Steps." Field 432 of screen 430 is provided to enable the user to input expected successful outcomes of the engagement. In field 434, the user can enter deliverables expected as a result of the engagement. In field 436, a target audience can be indicated for the project.

FIG. 4D illustrates an embodiment of a screen 440 for addressing specific criteria and budget of a project, and is associated with the selection of option "Criteria and Budget" in the left hand menu entitled "VET Steps." Criteria of a project that are critical and/or non-negotiable may be input into field 442. Criteria that are important, but not critical, may be input into field 444 and criteria that are not essential, but would be appreciated for the project, may be input into field 446. Finally, a budget or budget range for the project may be included in field 448.

FIG. 4E illustrates an embodiment of a screen 450 for addressing any additional information that would be beneficial for the RFI of a project, and is associated with the selection of option "Additional Info" in the left hand menu entitled "VET Steps." In field 452, the user can input any additional information not included in the preceding steps that would be useful or necessary for a supplier to provide a detailed and responsive submission. A response deadline request may be included in field 454 and a preferred start date for the project may be included in field 456. This screen also provides an opportunity for the user to upload files (see button "Upload Files"), wherein the user can upload other forms of information, such as specifications, requirements documents, interface documents, workflow documents, project detail documents, and so on. Finally, an indication of who, within the user entity, will be managing the project may be specified by selecting one of the options indicated at 458.

Once all of the information has been provided in the preceding VET Steps, as graphically indicated by the associated checkmarks, choosing "Next Step" in screen 450 causes the SKM system to render screen 460 of FIG. 4F, wherein the RFI is accordingly considered complete and ready for admin approval and then suppliers.

FIG. 4F illustrates an embodiment of screen 460 for prompting the user to engage venders/suppliers for the RFI project, and is associated with the selection of option "Next Steps" in the left hand menu entitled "VET Steps." In this embodiments, clicking on button 462 ("Get Supplier Recommendations") initiates the supplier selection and ranking process within the SKM system, which is described below with reference to FIGS. 6A and 6B.

As described above, the SKM system 70 includes a service that enables users of the system, e.g., employees or other representatives of an entity seeking a supplier, to search for suppliers of goods and/or services based on specific criteria input by the user. Likewise, suppliers are able to be included within the system by developing a supplier profile within the system. Either or both of the uses/suppliers inclusion within and usage of the system may be based on a subscription format.

In some embodiments, suppliers may be electronically invited to establish a supplier profile within the SKM system. Additionally, or alternatively, suppliers may initiate their own profiles on the SKM system. In some embodiments, suppliers may be required to pay a subscription fee for inclusion. And in some embodiments, there may be different levels of suppliers, having corresponding different levels of subscription fees. A supplier profile may include active links to its web site and/or social medium platforms, e.g., LinkedIn, Facebook, Twitter, Tumblr, and so on.

In this embodiment, the supplier evaluation module preforms a process of searching for suppliers that would potentially satisfy the requirements of the RFI, taking tags, keywords, and relationships into account. The may be referred to as the VET method, algorithm, or process. An embodiment of such a process is shown in FIG. 5.

Figure 5:
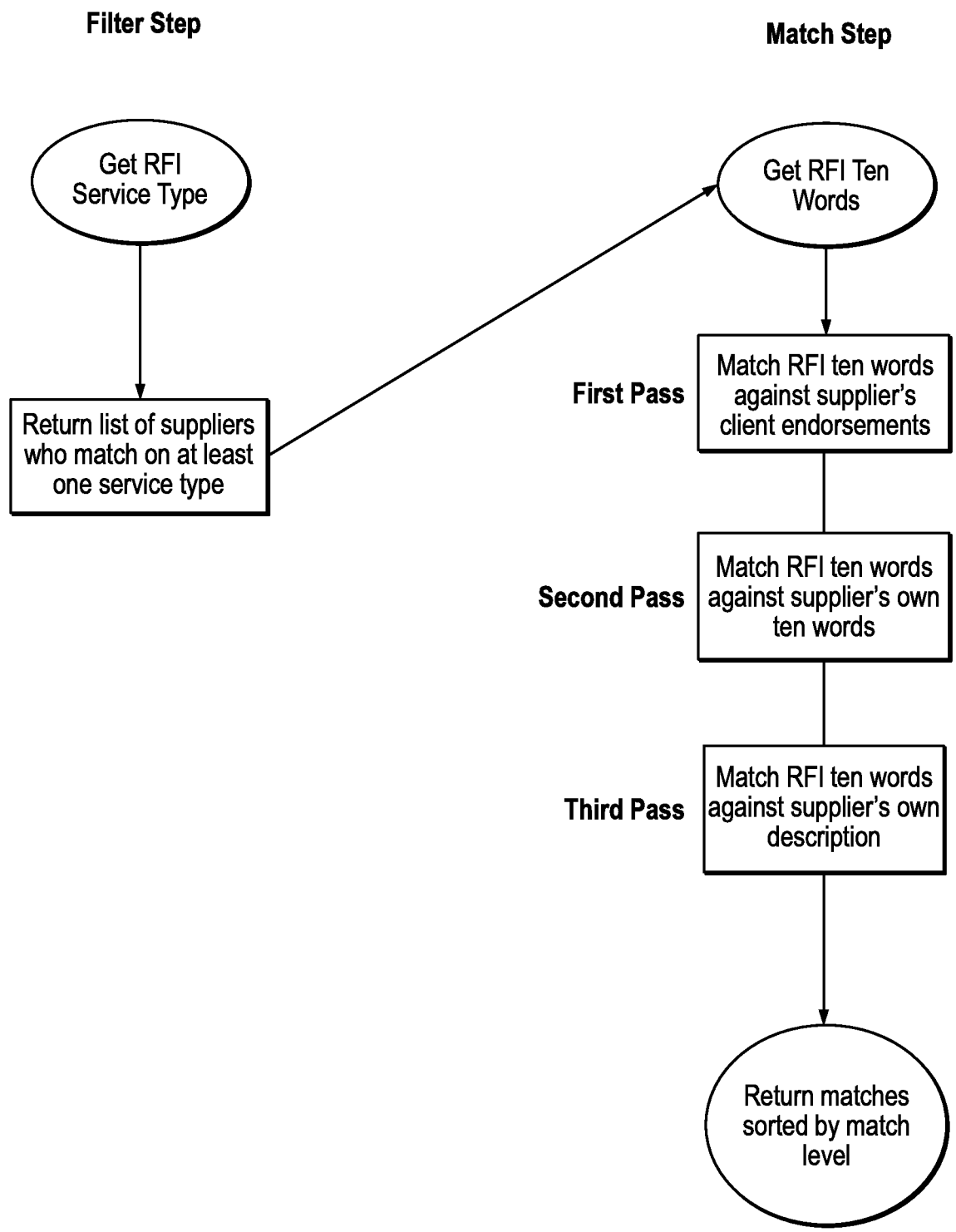
FIG. 5 is a flowchart diagram illustrating a SKM process for retrieving a list of candidate suppliers, in accordance with aspects of the present inventive concept.

At a high level, the VET process of FIG. 5 includes:
Step 1—Filter suppliers:
  Match RFI service type against supplier's chosen goods and/or services. If we match against at least one good or service then add that supplier to the matcher.
Step 2—Fetch Matches:
  First Pass: Match RFI ten words against supplier's client tags.
  Second Pass: Match RFI ten words against supplier's own ten words.
  Third Pass: Match RFI ten words against supplier's own description.
Step 3—Sorting results:
  Initial Sort (relationship with supplier):
    Supplier is in user's profile/account
    Supplier is in user's company profile/account
    Supplier has no relationship with client
  First Pass sorting (preferred supplier):
    1. If corporate account has listed supplier as "preferred" move to top of sort
  Second Pass sorting (supplier's client endorsements):
    1. Sort by breadth (number of tags matched)
    2. If two suppliers match on breadth, sort by sum of each tag's number of client endorsements
Example: Both A and B have two client endorsements, but B has the higher tag score so B is sorted above A.

TABLE 1

RFI Key Words: engaging, development, technology

| Supplier | Supplier's Client Endorsements | Tag Score |
|---|---|---|
| A | engaging (3 tags), development (5 tags) | 3 + 5 = 8 |
| B | engaging (4 tags), technology (7 tags) | 4 + 7 = 11 |

Third Pass Sorting (supplier ten words):
  1. Sort by number of supplier's ten words matching RFI ten words
Example: A is sorted above B because more words have been matched

TABLE 2

RFI Key Words: engaging, development, technology

| Supplier | Supplier's Ten Words | Number of words matched |
|---|---|---|
| A | engaging, technology, strategic | 2 |
| B | engaging, creative, innovative, decisive | 1 |

Fourth Pass Sorting (supplier description):
 1. Sort by number of words in supplier description matching RFI ten words
Example: B is sorted above A because more words have been matched.

TABLE 3

RFI Key Words: quality, digital, efficiently

| Supplier | Supplier's Description | Number of words matched |
|---|---|---|
| A | . . . We make learning memorable. Our team, our solutions, our project management processes all combined to ensure we deliver quality, on time and in scope . . . | 1 |
| B | . . . Our maxim: work rapidly and efficiently so that you can too. We aspire to revolutionize your actions, no matter the size, with our custom, digital solutions. We review your business processes, identify the strengths and weaknesses, and then optimize the details . . . | 2 |

The matches are returned and sorted by match level, for this example:

TABLE 4

| Rank | Vendor | Number of RFI Keyword Matches |
|---|---|---|
| 1 | B | 15 |
| 2 | C | 12 |
| 3 | A | 11 |

Figure 6A:
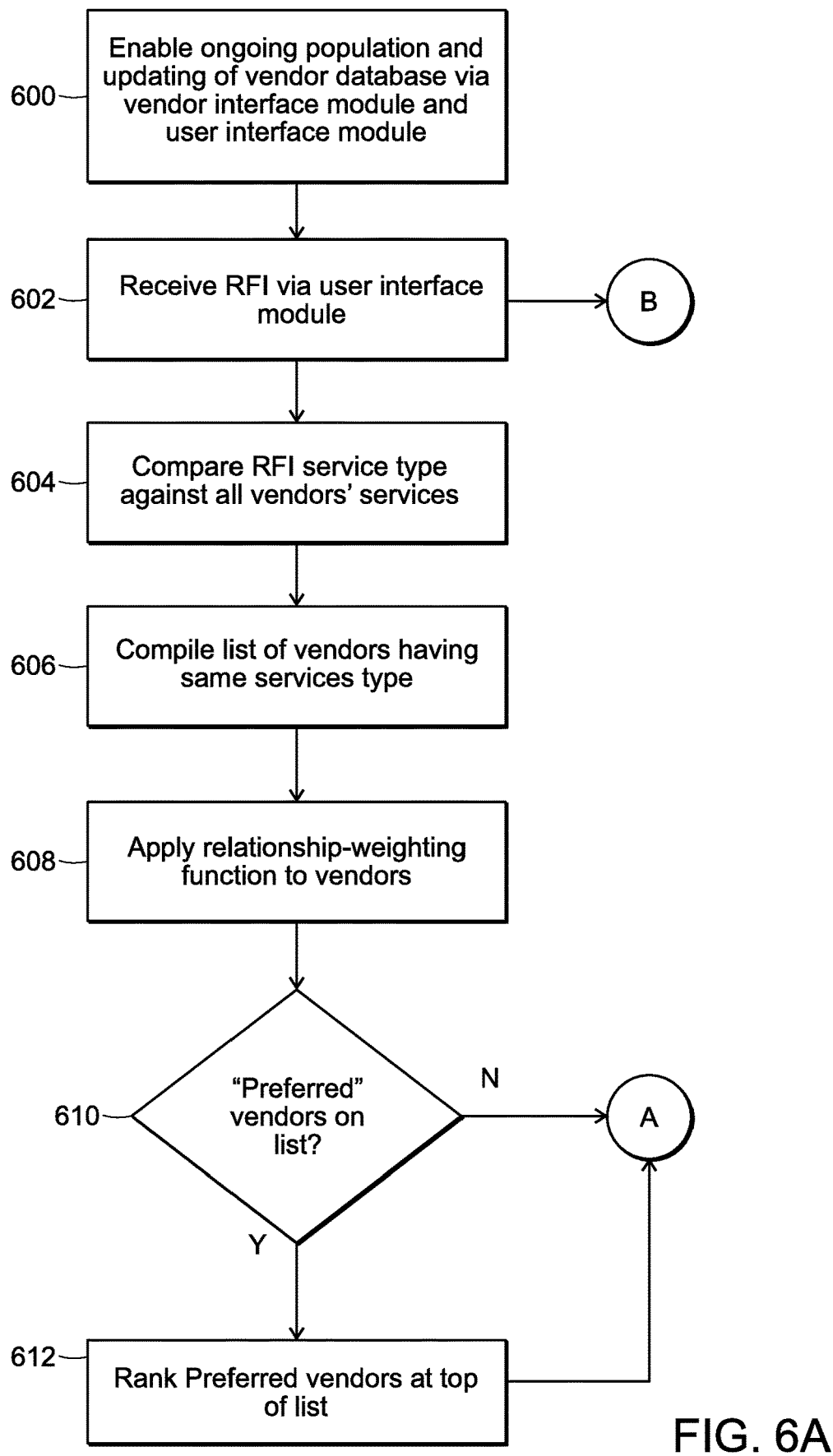
FIGS. 6A and 6B provide additional flowchart diagrams illustrating a SKM process, in accordance with aspects of the present inventive concept.
Figure 6B:
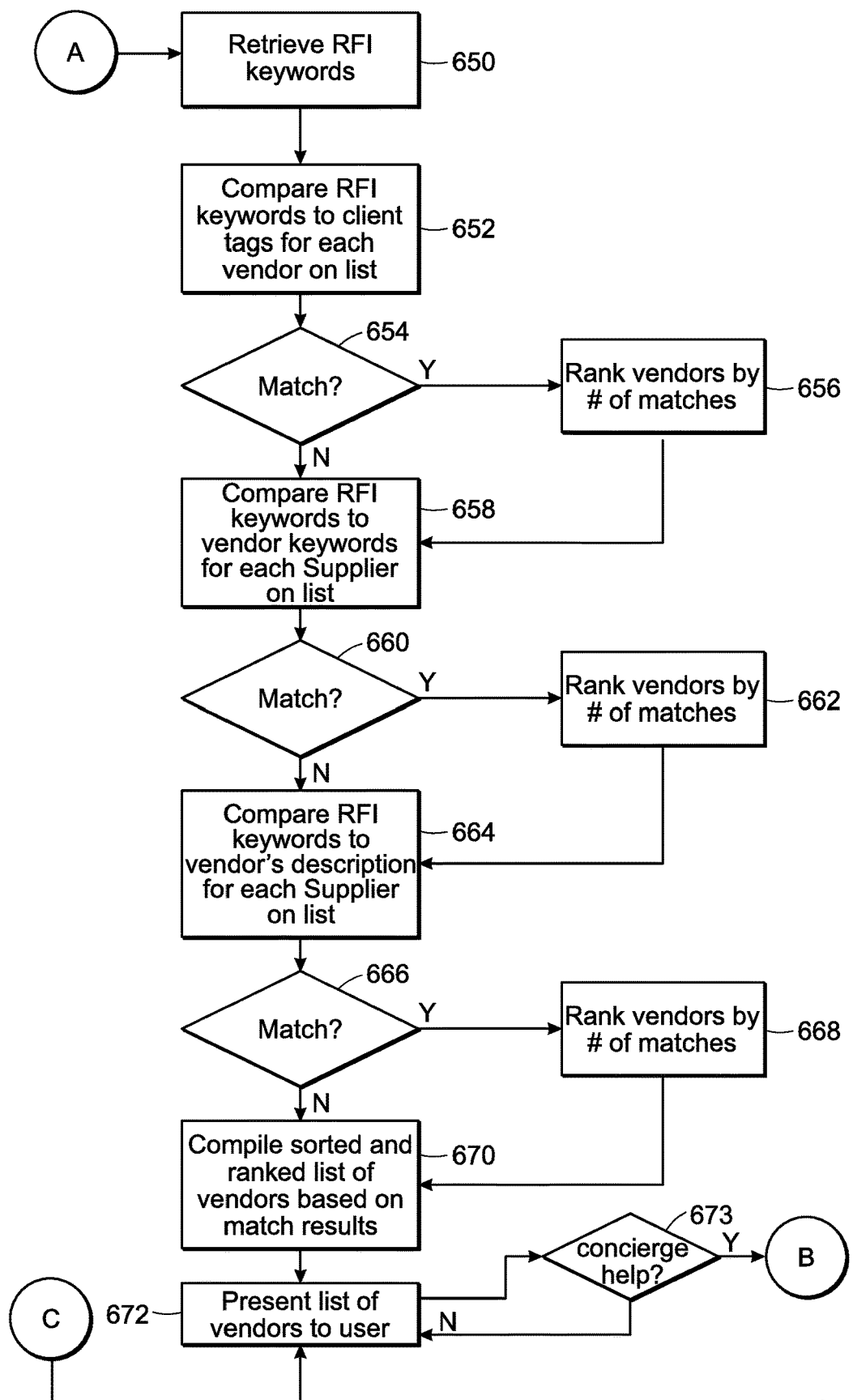

Referring to FIGS. 6A-6B, an embodiment of a method of selecting a supplier (or suppliers) that is implemented by the SKM system is shown, in accordance with aspects of the inventive concept. The method in FIGS. 6A-6B may be a more detailed embodiment of that shown in FIG. 5.

Step 600 involves the ongoing population and updating of the supplier profiles in the database 30 by the users and suppliers via the user interface module 72 and the supplier interface module 80, respectively. This step is more of a background step that can be occurring regularly, e.g., in real-time, by the SKM system to maintain an up-to-date database of suppliers for various RFI initiation processes.

Step 602 is the SKM system receiving an RFI via the user interface module, such as from selection of the "Get Supplier Recommendations" in screen 462 of FIG. 4F. From this stop, the method can continue to step 602 or step 684 in FIG. 6C. In Step 604, the SKM system compares the good and/or service type specified in the RFI against the offered goods and/or services specified by one or more suppliers in a database of suppliers. (see field 406 in FIG. 4A) In Step 606, the SKM system compiles a list of suppliers listing the good and/or service type sought by the RFI. In Step 608, a relationship-weighting function may be applied by the SKM system to the compiled list of suppliers. In this step, relationships between the users and/or user entities, e.g., employee and/or employer's company, and the suppliers may be utilized to favor suppliers that the user has worked with previously or has indicated a preference for in the eventual ranking of suppliers. For example, if a supplier is included in a user's personal supplier directory or if a supplier is in a user entity's supplier directory, but not in the specific directory of the user creating the RFI, such relationships may be used to either favor a supplier in the final ranking or at least to identify a supplier within the ranking as being in either the user's or user entity's directory. This enables users to quickly identify suppliers with whom a user might have a history.

If the supplier does not have a supplier profile, the SKM system can provide an automated or semi-automated mechanism for electronically inviting the supplier to generate a supplier profile. In some embodiments, users can initiate a basic supplier profile without the supplier and the supplier can later be invited or otherwise prompted to complete or activate the profile and/or subscribe to the SKM system. Alternatively, or additionally, the SKM system can be pre-populated with basic supplier profiles, and the SKM system and/or users of the SKM system can invite or otherwise prompt the supplier to complete or activate is supplier profile and/or enter a subscription to the SKM system. Completing or activating a supplier profile can be a prerequisite enforced by the SKM system for accepting a supplier response to an RFI, being considered by the SKM system for RFIs by users that have not listed the supplier in the user's or user entity's directory, or both.

A method for ensuring that a particular supplier will be highlighted in the ranking is for a user to identify a supplier or suppliers as "Preferred" in the user's or user's company's directory, or other such designation. A designation of "Preferred" can be used to ensure that, if a preferred supplier is identified as offering the service specified in the RFI, that supplier will be ranked at the top of the list of suppliers, regardless of the outcome of the supplier selection process described below with reference to FIG. 6B. In Step 610, if any "Preferred" suppliers are included in the list compiled in Step 106, those suppliers are flagged to be ranked, in Step 612, at the top of the supplier list. Once the suppliers offering the sought services are identified, the supplier selection continues at Step 650, FIG. 6B.

Referring now to FIG. 6B, in Step 650, the SKM system retrieves and compares the RFI keywords to the client tags 208, see FIG. 2B, for each supplier on the compiled list of suppliers, Step 652. If no matches are found in Step 654, the process moves to Step 658. However, if any of the RFI keywords match the client tags listed in a supplier's profile, in Step 654, the number of client tags matched is tallied and the suppliers are ranked accordingly by the SKM system, in Step 656. Either way, the method continues to Step 658.

An example of such a ranking is shown in the Table 1 above. As shown in the example table, the RFI keywords are "engaging," "development," and "technology." As set forth above, the RFI keywords can be any words selected by the user and, in an embodiment, the user may select up to 10 RFI keywords in a single RFI. For simplicity in explaining this feature, only 3 RFI keywords are shown, but it should be understood that the process applies regardless of the number of RFI keywords.

In Table 1, Suppliers A, B, and C have been identified by the SKM system in Step 654, FIG. 6B, and included in the compiled list, Step 656. Since the profile of Supplier B included 4 client tags of "engaging" and 7 client tags of "technology," its tag score for this step is 11. Supplier A, having 3 client tags of "engaging" and 4 client tags of "development" has a tag score of 8 and Supplier C, having 1 client tag of "engaging," 3 client tags of "development," and 3 client tags of "technology," has a tag score of 7. The suppliers are ranked, here listed, according to the tag scores in Table 1 by the SKM system, with Supplier B ranked $1^{st}$.

Returning to Step 658 in FIG. 6B, the RFI keywords are compared to the supplier keywords 204, see FIG. 2A, for each supplier on the compiled list of suppliers. If no matches are found in Step 660, the process moves to Step 664.

However, if any of the RFI keywords match the supplier keywords listed in a supplier's profile, in Step 660, the number of supplier keywords matched is tallied and the suppliers are ranked accordingly by the SKM system, in Step 662.

An example of such a ranking is shown in Table 2. Again, as set forth above, the supplier keywords can be any words selected by the supplier and, in an embodiment, the supplier may select up to 10 supplier keywords for its supplier profile. For simplicity in explaining this feature, only 3 supplier keywords are shown, but it should be understood that the process applies regardless of the number of supplier keywords.

In Table 2, Supplier C has keywords "engaging," "development," and "technology." Therefore, Supplier C has matched 3 supplier keywords with the RFI keywords. Supplier A has keywords "engaging," "technology," and "strategic." Therefore, Supplier A has matched 2 supplier keywords with the RFI keywords. Further, Supplier B has keywords "engaging," "creative," and "innovative." Therefore, Supplier B has matched 1 supplier keyword with the RFI keywords.

In Step 664, the SKM system compares RFI keywords to the supplier description 206, in FIG. 2B, for each supplier on the compiled list of suppliers. If no matches are found, in Step 666, the process moves to Step 670. However, if any of the RFI keywords match words in the supplier description included in a supplier's profile, in Step 666, the number of words matched is tallied and the suppliers are ranked accordingly, in Step 668.

An example of such a ranking is shown in Table 3 (above). For simplicity in explaining this feature, only example portions of supplier descriptions are shown. It should be understood that a supplier description would likely include a more thorough description.

In Table 3, the supplier description of Supplier B has matched 3 of the RFI keywords, the supplier description of Supplier C has matched 2 of the RFI keywords, and the supplier description of Supplier A has matched 1 of the RFI keywords.

In Step 670, a sorted and ranked listing of the suppliers is compiled and presented to the user, Step 672. Optionally, the method can proceed to Step 673, where the user is given an option of using the concierge service module 73 and related method of FIG. 6C. If the user takes the no (N) path in Step 673, the user can chose from the list presented in Step 672.

As shown in Table 4, which provides an example of a supplier listed output as a result of Step 672, Supplier B ranks first with 15 matches, Supplier C ranks second with 12 matches, and Supplier A ranks third with 11 matches.

As set forth above, if either Supplier A or Supplier B were indicated as being a "Preferred Supplier," it would have been presented first on the list. Further, if Suppliers A, B or C are in the user's supplier directory or the user entity's supplier directory, a weighting factor can be applied to the score to be reflected in the final ranking. The weighting factor is selectable by the user/user entity and could, for example, add a predetermined number of "bonus" matches to a supplier depending on the relationship of the supplier with the user or the relationship could be reflected in the final ranking simply by marking a supplier as one that is included in a directory.

Once the ranked list is compiled and presented to the user, the user is able to review the list and select one or more suppliers to which the RFI will be submitted. The system then tracks communications between the supplier and user as the RFI is processed.

In the case of a corporate or entity user, an administrative function is available that facilitates overview and tracking of all RFIs created by the system and submitted to suppliers, as discussed above with respect to FIGS. 3D-3I. An administrator is able to access a list of all employees' usage of the system and to view each employee's supplier directory. The administrator is able to grant or remove administrator status for each employee. The administrator can also view suppliers added to the entity directory by employees of the company and can filter that list by the tags used by the employees to define the suppliers. The supplier profile of every supplier in the directory is accessible by the administrator. The administrator is also able to designate a supplier as a "preferred" supplier or to add various authorizations if there are Master Services or Confidentiality agreements in place with a supplier.

Figure 6C:
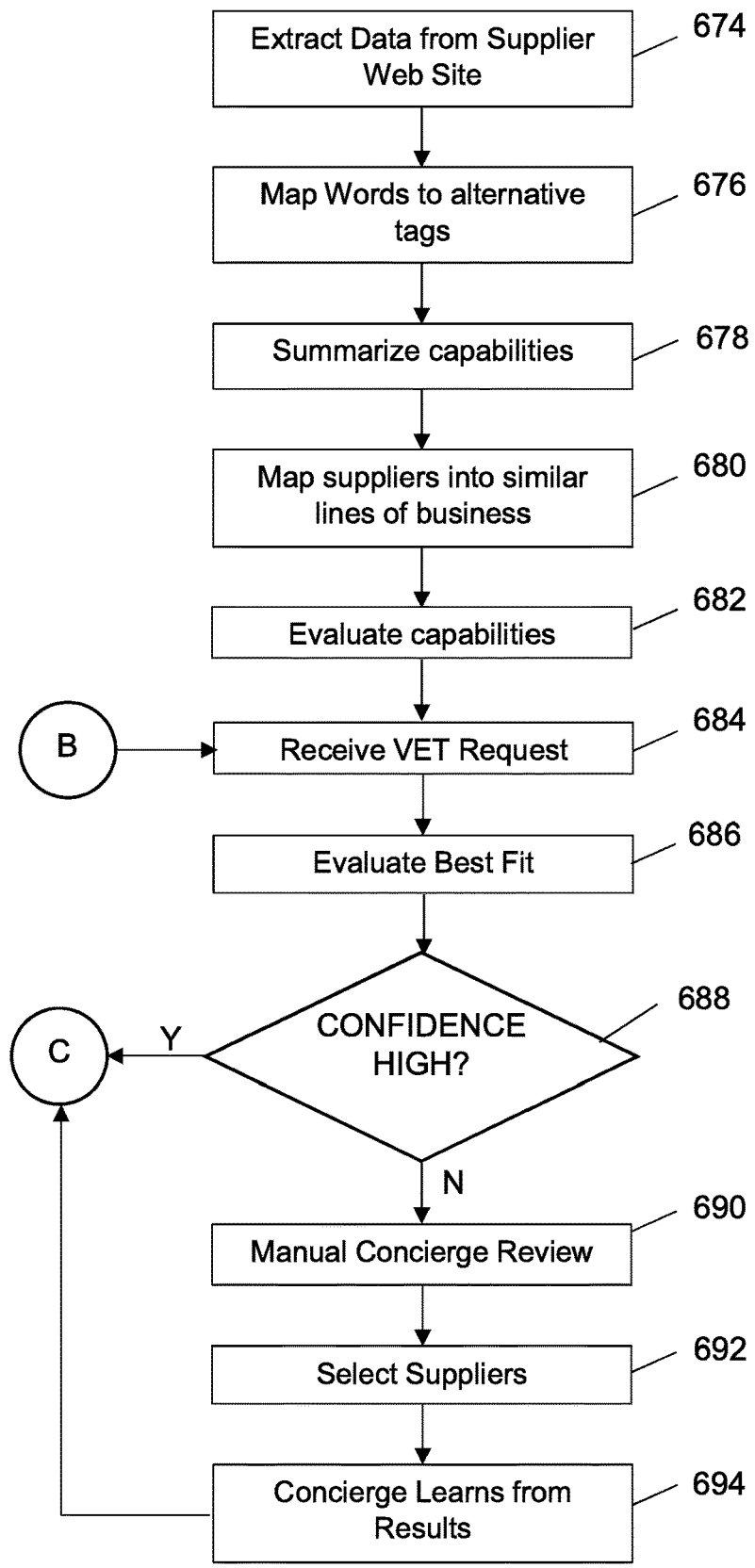
FIG. 6C is a flowchart diagram illustrating an embodiment of a method of providing an automated concierge capability, in accordance with aspects of the inventive concept.

Referring now to FIG. 6C, an embodiment of a concierge method is shown, which can be implemented using the concierge service module 73 of FIG. 1D. The concierge module can be used to help build or augment a supplier profile within the SKM system. It is advantageous to the supplier that its profile leads the SKM system to automatically recommend the supplier to fulfill a client's needs for goods and/or services. In Step 674, the concierge module 73 extracts data from a supplier web site. In Step 676, the concierge module maps words and tags extracted from the supplier's website to alternative tags within the system. Such alternative tags can be words or phrases known to have similar meaning within the field of the supplier. As an example, if the phrase "biohazard waste disposal" is extracted from a supplier's website, an alternative tag presented by the concierge module could be "medical waste." The supplier could opt to include the alternative tags to its profile or not.

In Step 678, the concierge modules can also summarize the supplier's capabilities from the content of the supplier's website, e.g., from the extracted data in step 674. In Step 680, the concierge module could map the supplier into a grouping of suppliers in similar lines of business. In Step 682, the concierge module determines the credibility/level of experience the supplier has for each capability that is claimed on their website.

In Step 684, a VET request is received. If, in Step 673 of FIG. 6B, the user chose the yes (Y) option to use the concierge method, the process continues to Step 684 in FIG. 6C where the concierge module receives and/or accesses the VET request. In Step 686, the concierge modules 73 evaluates best fit for the VET request using available data, such as within the SKM system.

In Step 688, a question of whether or not confidence is high in the list of suppliers generated and output by the SKM system, based on the results of Step 688. If the answer in Step 688 is yes (Y), the process returns to Step 672 via connector "C", where the supplier list it output. But if the answer in Step 688 is no (N), the method continues to Step 690, where the manual component of the concierge module 73 can be used by a user as discussed above.

In Step 692, the user can manually select suppliers from an output prompted by the concierge module. In Step 694, the concierge module learns from the user's interaction and stores the learned knowledge for future use in generating list of suppliers. The process continues, via connector "C" back to Step 672 of FIG. 6B where an updated supplier list is output.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A computer-based supplier knowledge management (SKM) method, comprising:
   providing a network accessible computer system comprising at least one computer processor coupled to at least one storage medium and computer program code configured for storage therein and execution thereby; and
   executing the computer program code to perform the computer-based supplier knowledge management method, including:
      establishing an electronic profile for one or more users from an entity, including identifying preferred suppliers in association with the electronic profile;
      establishing electronically a plurality of supplier profiles, each supplier profile comprising a set of supplier keywords;
      including user selected client tags representing user endorsements in one or more of the plurality of supplier profiles;
      a user generating an electronic request for information (RFI) for performing an electronic search of supplier information, the RFI comprising a set of user specified RFI keywords corresponding to a project for an entity; and
      electronically processing the RFI, including:
         comparing the RFI keywords with supplier keywords of one or more of the plurality of supplier profiles to generate a filtered set of supplier profiles and identifying any preferred suppliers associated with the entity in the filtered set of supplier profiles;
         comparing the RFI keywords with client tags in the filtered set of supplier profiles to generate a list of candidate suppliers; and
         displaying at a computer screen the list of candidate suppliers.

2. The method of claim 1, wherein
   the RFI identifies one or more RFI good and/or service type for the project and each supplier profile includes one or more supplier good and/or service type, and
   processing the RFI includes good and/or service type matching that determines the list of candidate suppliers as suppliers having a good and/or service type matching an RFI good and/or service type.

3. The method of claim 2, wherein executing the computer program code to perform the method further includes performing, by the system, the good and/or service type matching before the keyword matching, and wherein the keyword matching is only performed on supplier profiles having a good and/or service type match.

4. The method of claim 1, wherein performing the keyword matching includes calculating a keyword matching score for each of the one or more supplier profiles.

5. The method of claim 4, wherein each supplier profile further includes the one or more of the client tags and/or a supplier description, and performing the keyword matching for a supplier includes:
   determining matches between RFI keywords and the client tags in the supplier profile; and/or
   determining matches between the RFI keywords and the supplier keywords in the supplier profile; and/or
   determining matches between the RFI keywords and the supplier description in the supplier profile.

6. The method of claim 5, wherein performing the keyword matching for the supplier profile includes:
   calculating a supplier tag score based on a number of matches between the RFI keywords and the client tags in the supplier profile; and/or
   calculating a supplier keyword score based on a number of matches between the RFI keywords and the supplier keywords in the supplier profile; and/or
   calculating a supplier description score based on a number of matches between the RFI keywords and the supplier description in the supplier profile.

7. The method of claim 6, wherein:
   calculating the supplier tag score for the supplier profile includes summing the number of matches between the RFI keywords and the client tags in the supplier profile; and/or
   calculating the supplier keyword score for the supplier profile includes summing the number of matches between the RFI keywords and the supplier keywords in the supplier profile; and/or
   calculating the supplier description score for the supplier profile includes summing the number of matches between the RFI keywords and the supplier description in the supplier profile.

8. The method of claim 7, wherein the method includes calculating the keyword matching score for a supplier profile by summing at least two of the supplier tag score, the supplier keyword score, and the supplier description score.

9. The method of claim 4, wherein generating the list of candidate suppliers includes ordering the list of candidate suppliers based on the keyword matching scores.

10. The method of claim 4, wherein calculating a keyword matching score for each supplier on the list of candidate suppliers includes associating a numerical value for each keyword match between an RFI keyword and a supplier keyword from the corresponding supplier profile.

11. The method of claim 10, wherein calculating a keyword matching score for each supplier includes accumulating the numerical values for each supplier based on the keyword matching for the corresponding supplier profile.

12. The method of claim 1, including storing the set of preferred suppliers in association with an entity profile.

13. The method of claim 1, including storing the set of preferred suppliers in association with a user profile.

14. The method of claim 1, wherein the supplier profile comprises a plurality of elements, including a description of services offered, peer endorsement tags and, optionally, one or more of a logo, web site URL, contact information, client testimonials and social media links.

15. The method of claim 1, further comprising:
   providing, by the system, mechanisms to enable user tagging of a supplier profile, wherein a tag is a word tag applied to the supplier profile as an electronic endorsement of the supplier via its supplier profile.

16. The method of claim 15, further comprising:
   first pass sorting the list of candidate suppliers, including putting preferred suppliers above other suppliers.

17. The method of claim 16, further comprising:
   second pass sorting the list of candidate suppliers, including determining a tag matching score for each supplier and ordering suppliers based on the tag matching score, with a supplier having the highest tag score above suppliers with lower tag scores.

18. The method of claim 17, wherein second pass sorting includes, if two or more suppliers tag scores match, sorting based on a number of client endorsements for each tag for each supplier, with the supplier having the highest number above the other suppliers.

19. The method of claim 18, further comprising:
third pass sorting the list of candidate suppliers, including listing suppliers having a highest keyword matching score above suppliers with lower keyword matching scores.

20. The method of claim 1, further comprising:
imposing, by the system, an upper limit on a number of supplier keywords for the supplier profile.

21. The method of claim 20, wherein the upper limit of supplier keywords is equal to or less than 20 total supplier keywords.

22. The method of claim 21, wherein the upper limit of supplier keywords is 10 total supplier keywords.

23. The method of claim 1, further comprising:
providing, by the system, electronic mechanisms enabling a supplier to add a set of keywords representing supplier competencies as supplier keywords.

24. The method of claim 1, further comprising:
in response to a user input via a user input device, adding an endorsement tag to a supplier profile.

25. The method of claim 1, wherein the supplier profiles are in the field of healthcare and supplier competencies are related to healthcare goods and/or services and/or goods and/or services useful to healthcare providers.

26. The method of claim 1, further including providing a concierge module that learns from historic request patterns and stores results from the historic request patterns for future use in generating the list of candidate suppliers.

27. The method of claim 26, wherein the concierge module comprises an automated component and a manual component, wherein the automated component learns from historic request patterns to recommend appropriate suppliers and the manual component enables a user to monitor system-generated recommendations and assist where results of the automated component are insufficient.

28. A computer-based supplier knowledge management (SKM) method, comprising:
providing a network accessible computer system comprising at least one computer processor coupled to at least one storage medium and computer program code configured for storage therein and execution thereby; and
executing the computer program code to perform the computer-based supplier knowledge management method, including:
establishing an electronic profile for one or more users from an entity, including identifying preferred suppliers in association with the electronic profile;
establishing electronically a plurality of supplier profiles, each supplier profile comprising a set of supplier keywords;
a user generating an electronic request for information (RFI) to initiate an electronic search of supplier information, the RFI comprising a set of user specified RFI keywords corresponding to a project for an entity; and
electronically processing the RFI, including performing keyword matching, including determining a first match between the RFI keywords and supplier keywords of one or more of the plurality of supplier profiles to generate a filtered set of supplier profiles and determining a second match between the RFI keywords and client tags in the filtered set of supplier profiles to generate a list of candidate suppliers for the project, including identifying any preferred suppliers associated with the entity in the filtered set of supplier profiles; and
displaying at a computer screen the client tags for filtering the plurality of suppliers.

* * * * *